(12) United States Patent
Nakamura et al.

(10) Patent No.: US 9,367,133 B2
(45) Date of Patent: Jun. 14, 2016

(54) DEVICES, SYSTEMS, AND METHODS FOR PROVIDING PHYSICAL FEEDBACK IN A HANDHELD ELECTRONIC CONTROLLER

(71) Applicant: LENOVO (SINGAPORE) PTE. LTD., Singapore (SG)

(72) Inventors: Fusanobu Nakamura, Yamato (JP); Qiang Zhang, Beijing (CN)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 130 days.

(21) Appl. No.: 13/788,166

(22) Filed: Mar. 7, 2013

(65) Prior Publication Data

US 2014/0253448 A1  Sep. 11, 2014

(51) Int. Cl.
*G06F 3/01* (2006.01)
*H01F 7/02* (2006.01)
*G06F 3/0338* (2013.01)
*G06F 3/0354* (2013.01)

(52) U.S. Cl.
CPC .............. *G06F 3/016* (2013.01); *G06F 3/0338* (2013.01); *G06F 3/03543* (2013.01); *G06F 3/03548* (2013.01); *H01F 7/0252* (2013.01)

(58) Field of Classification Search
CPC ... G06F 3/016; G06F 3/0338; G06F 3/03548; G06F 3/03543; H01F 7/02; H01F 7/0252

USPC ................................................. 345/156–179
See application file for complete search history.

(56) References Cited

U.S. PATENT DOCUMENTS

| 6,001,014 A * | 12/1999 | Ogata | A63F 13/02 463/37 |
| 6,693,622 B1 * | 2/2004 | Shahoian | G06F 3/016 345/156 |
| 2007/0091063 A1 * | 4/2007 | Nakamura | G06F 3/016 345/156 |
| 2012/0068942 A1 * | 3/2012 | Lauder | H01F 7/04 345/173 |

* cited by examiner

*Primary Examiner* — Amare Mengistu
*Assistant Examiner* — Jennifer Zubajlo
(74) *Attorney, Agent, or Firm* — Nutter McClennen & Fish LLP; John J. Penny, Jr.

(57) ABSTRACT

Devices, systems, and methods are provided for providing physical feedback in a handheld electronic controller. In general, the devices, systems, and methods can allow a handheld controller in an electronic system to provide a shock force or impact force to a user of the controller. In one exemplary embodiment, the controller can be configured to provide the shock or impact force in correspondence with a virtual shock force or impact force in an entertainment system in communication with the controller being controlled by the user. The actual shock force or impact force can be directionally imparted to the controller such that the user feels the actual shock force or impact force in a same direction as the virtual shock force or impact force.

14 Claims, 14 Drawing Sheets

FIG. 19

| Position | Changed Magnets | Figure(s) |
|---|---|---|
| 0 | -- | 4-7, 13, 15, 16 |
| 1 | 116a, 116b, 116h | -- |
| 2 | 116a, 116b | -- |
| 3 | 116a, 116b, 116c | 17 |
| 4 | 116b, 116c | 18 |
| 5 | 116b, 116c, 116d | -- |
| 6 | 116c, 116d | -- |
| 7 | 116c, 116d, 116e | -- |
| 8 | 116d, 116e | -- |
| 9 | 116d, 116e, 116f | -- |
| 10 | 116e, 116f | -- |
| 11 | 116e, 116f, 116g | -- |
| 12 | 116f, 116g | -- |
| 13 | 116f, 116g, 116h | -- |
| 14 | 116g, 116h | -- |
| 15 | 116g, 116h, 116a | -- |
| 16 | 116h, 116a | -- |

DEVICES, SYSTEMS, AND METHODS FOR PROVIDING PHYSICAL FEEDBACK IN A HANDHELD ELECTRONIC CONTROLLER

FIELD OF THE INVENTION

The present invention relates generally to devices, systems, and methods for providing physical feedback in a handheld electronic controller.

BACKGROUND OF THE INVENTION

A variety of handheld electronic controllers allow a user to control action in an entertainment system, such as in a video game. Conventional handheld electronic controllers can provide physical feedback to a user based on the action through a vibration or shock force. However, one drawback with conventional handheld electronic controllers is that the vibration or shock force is typically a weak force that does not accurately reflect some virtual actions that have more violent impact than a vibration or shock force. Another drawback with conventional handheld electronic controllers is that the vibration or shock force is typically unable to be directionally provided to the user such that the user cannot palpably feel a directional source of the virtual action.

Accordingly, there remains a need for improved devices, systems, and methods for providing physical feedback in a handheld electronic controller.

SUMMARY OF THE INVENTION

In one embodiment, a device is provided that includes an outer housing and an inner housing seated within the outer housing. The outer housing has a plurality of electromagnets disposed around a perimeter thereof. Each of the electromagnets is configured to selectively and individually change polarity. The inner housing is configured to move relative to the outer housing, and the inner housing has a plurality of permanent magnets disposed around a perimeter thereof. Each of the permanent magnets has a permanent polarity and faces one of the electromagnets having a default polarity opposite to the permanent polarity of the magnet such that the polarities of the facing permanent magnets and electromagnets in their default polarities cause the inner housing to be at a first position relative to the outer housing, and, when at least one of the electromagnets changes from the default polarity to another, opposite polarity, the polarities of the facing permanent magnets and electromagnets cause the inner housing to move from the first position to a second position relative to the outer housing. The second position is offset from the first position.

The device can vary in any number of ways. For example, the inner housing in the first position can be centrally positioned within the outer housing, and the inner housing in the second position can not be centrally positioned within the outer housing. For another example, the outer housing having the inner housing seated therein can be configured to be disposed within a handheld entertainment controller. For yet another example, the second position can be one of at least sixteen different possible positions of the inner member relative to the outer member.

The device can include a movement assembly coupled to the inner housing and configured to limit movement of the inner housing relative to the outer housing in an X direction and in a Y direction perpendicular to the X direction, and to prevent the inner housing from rotating relative to the outer housing, when the at least one of the electromagnets changes from the default polarity to the other, opposite polarity. The second position can be one of a number of possible positions of the inner member relative to the outer member. The number can be twice a number of the electromagnets. The movement assembly can include a slidable member attached to the inner housing, a first track in which the slidable member is configured to move in the X direction so as to move the inner housing in the X direction, and a second track in which the slidable member is configured to move in the Y direction so as to move the inner housing in the Y direction.

The device can include a body having the outer housing and the inner housing disposed therein. The body can be configured to move when the at least one of the electromagnets changes from the default polarity to the other, opposite polarity. The device can also include a processor configured to cause the at least one of the electromagnets to change from the default polarity to the other, opposite polarity in response to an impact force that occurs in action of an entertainment system displayed on a display, thereby causing the housing to move and provide physical feedback of the impact force to a user manipulating the body. The body can include a user controller of the entertainment system.

In another aspect, a system is provided that in one embodiment includes a housing configured to be manipulated by a hand of a user in controlling action of an entertainment system displayed on a display, and a movement assembly disposed within the housing. The movement assembly includes an outer member, an inner member disposed within the outer member, and a translation member. The inner member is configured to move relative to the outer member in an X direction and in a Y direction perpendicular to the X direction. The translation member is configured to limit movement of the inner member relative to the outer member to the X direction and the Y direction, and the translation member is configured to prevent the inner member from rotating relative to the outer member.

The system can have any number of variations. For example, the movement assembly can include a slidable member attached to the inner member, a first track in which the slidable member can be configured to slide in the X direction so as to move the inner member in the X direction, and a second track in which the slidable member can be configured to slide in the Y direction so as to move the inner member in the Y direction. For another example, the translation member can be configured to allow the inner member to move relative to the outer member in the X direction and the Y direction such that the inner member can move in at least sixteen different directions relative to the outer member. For yet another example, the system can include a plurality of magnets disposed around a perimeter of the inner member, and a plurality of magnets disposed around a perimeter of the outer member. Each of the magnets of the inner member can face one of the magnets of the outer member. Each of the magnets of the outer member can be configured to selectively and individually change between a first polarity and a second, opposite polarity such that when at least one of the magnets of the outer member changes polarity, the inner member moves relative to the outer member in at least one of the X direction and the Y direction. The plurality of the magnets of the outer housing can be electromagnets. For another example, the system can include a processor configured to cause the inner member to move relative to the outer member in at least one of the X direction and the Y direction in response to an impact force that occurs in the action of the entertainment system displayed on the display, thereby causing the housing to move and provide physical feedback of the impact force to the user manipulating the housing.

In another aspect, a method is provided that in one embodiment includes receiving an input from an entertainment system controller, causing a result of the input to be displayed on a display, and causing the controller to move in response to the result by causing one or more magnets attached to an outer housing disposed within the controller to change polarity. The change in polarity causes an inner housing seated within the outer housing to translate relative to the outer housing without rotating relative to the outer housing.

The method can vary in any number of ways. For example, causing the one or more magnets to change polarity can cause a corresponding one or more magnets attached to the inner housing to be attracted to the one or more magnets attached to the outer housing. For another example, the method can include causing the one or more magnets to change polarity again, thereby causing the inner housing to translate again relative to the outer housing without rotating relative to the outer housing. For yet another example, causing the one or more magnets to change polarity can include changing the polarity of only up to three of the magnets. For another example, causing the inner housing to translate relative to the outer housing can include the inner housing moving in one of at least sixteen different possible directions relative to the outer member.

BRIEF DESCRIPTION OF THE DRAWINGS

The invention will be more fully understood from the following detailed description taken in conjunction with the accompanying drawings, in which:

FIG. 19 is a table showing various positions of the inner housing of the impact unit of FIG. 4 moved to a different position relative to the outer housing of the impact unit.

DETAILED DESCRIPTION OF THE INVENTION

Figure 1:
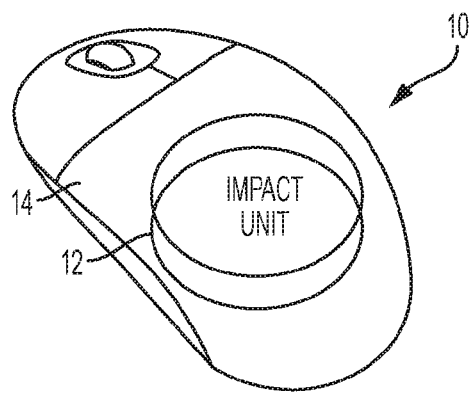
FIG. 1 is a perspective view of one embodiment of a handheld controller having an impact unit disposed therein.

Certain exemplary embodiments will now be described to provide an overall understanding of the principles of the structure, function, manufacture, and use of the devices and methods disclosed herein. One or more examples of these embodiments are illustrated in the accompanying drawings. Those of ordinary skill in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

In the present disclosure, like-numbered components of the embodiments generally have similar features, and thus within a particular embodiment each feature of each like-numbered component is not necessarily fully elaborated upon. Sizes and shapes of devices and components of electronic systems discussed herein can depend at least on the electronic systems in which the devices and components will be used.

Various exemplary devices, systems, and methods are provided for providing physical feedback in a handheld controller. In general, the devices, systems, and methods can allow a handheld controller in an electronic system to provide a shock force or impact force to a user of the controller. In an exemplary embodiment, the controller can be configured to provide the shock or impact force in correspondence with a virtual shock force or impact force in an entertainment system in communication with the controller being controlled by the user. In other words, when a shock force or impact force occurs in a virtual electronic entertainment system such as in a video game, e.g., a car crash, a landed boxing punch, a shot recoil, a caught baseball, a struck hockey puck, etc., the user can experience an actual shock force or impact force via the controller. The entertainment system can thus be more realistic and more exciting for the user. The shock force or impact force can be greater than a vibration force, which can make the entertainment system more realistically mimic a virtual shock force or impact force. The actual shock force or impact force can be directionally imparted to the controller such that the user feels the actual shock force or impact force in a same direction as the virtual shock force or impact force. The actual shock force or impact force can thus be realistically felt by the user and/or can provide the user with information not visually available on a display of the entertainment system, such as if action in a video game is occurring in dim or no light in which the user cannot clearly visually discern a source of the shock force or impact force by viewing the display.

A person skilled in the art will appreciate that the devices, systems, and methods disclosed herein can be implemented using an electronic system including a display. The term "electronic system" as used herein refers to any of a variety of digital data processing devices, e.g., laptop or notebook computers, tablet computers, server computers, cell phones, PDAs, gaming systems, televisions, radios, portable music players, and the like. The term "display" as used herein refers to any of a variety of display devices, e.g., a liquid crystal display (LCD), a light-emitting diode (LED) screen, a cathode ray tube (CRT) screen, a touchscreen, a 3D screen, and the like. Additionally, the term "display" as used herein can refer to a display that is fixedly mounted in the same chassis or package as a base of an electronic system, as well as to displays that are removably and replaceably connected, wired or wirelessly, to the same chassis or package as a base of an electronic system.

Figure 2:
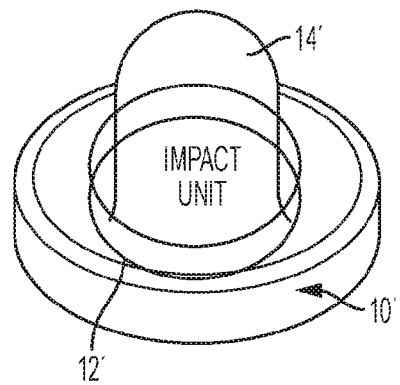
FIG. 2 is a perspective view of another embodiment of a handheld controller having an impact unit disposed therein.

FIG. 1 illustrates one exemplary embodiment of a handheld controller 10 configured to provide a shock force or impact force to a user of the controller 10. The controller 10 can be part of an electronic system (not shown) and can be configured to control various aspects of the system, e.g., control action shown on a display of the electronic system, such as in a video game. The controller 10 can include an impact unit 12 disposed within a body 14 of the controller 10. The impact unit 12 can, as further discussed below, be configured to move relative to the body 14 so as to cause a shock force or impact force configured to be palpably felt by a user handling the body 14. Although the controller 10 in this illustrated embodiment includes a mouse, other embodiments of handheld entertainment controller can include other types of controllers, as will be appreciated by a person skilled in the art. For example, FIG. 2 illustrates another embodiment of a handheld entertainment controller 10' in the form of a joystick paddle. The controller 10' can include an impact unit 12' disposed within a body 14' of the controller 12' and can be configured to move relative to the body 14' so as to provide a palpably detectable shock force or impact force.

A handheld controller can include and/or be in communication with any of a variety of software and/or hardware components. In addition, although an exemplary entertainment system is depicted and described herein, a person skilled in the art will appreciate that this is for sake of generality and convenience. In other embodiments, the electronic system may differ in architecture and operation from that shown and described with respect to any of the illustrated embodiments.

Figure 3:
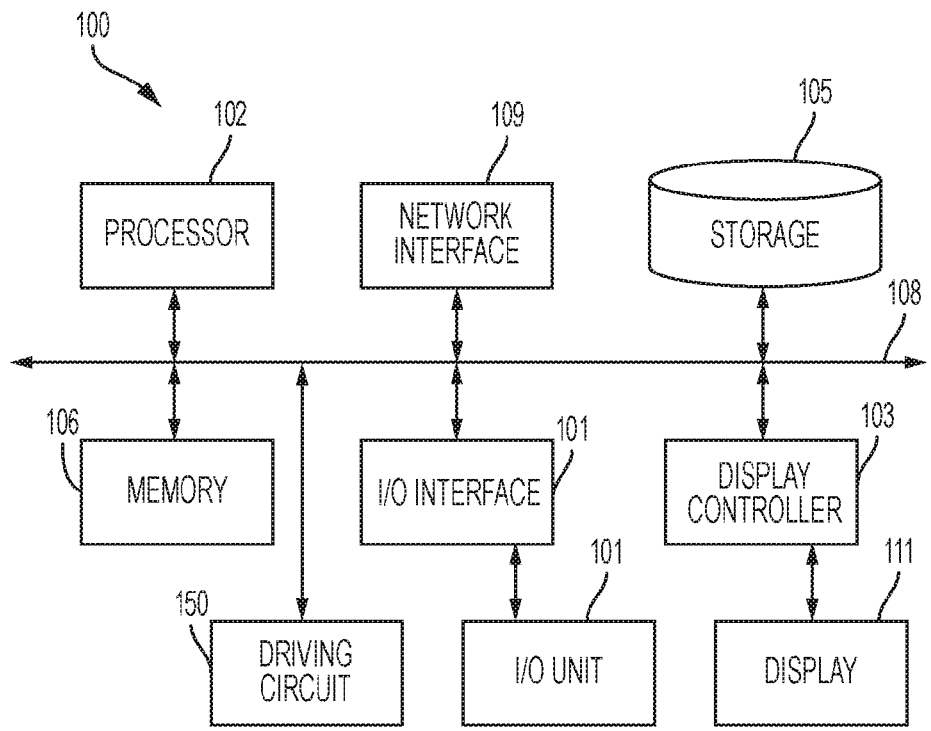
FIG. 3 is a schematic diagram of one embodiment of an electronic system.

As shown in FIG. 3, an electronic system 100 can include a processor 102 which controls the operation of the system 102, for example by executing an operating system (OS), a basic input/output system (BIOS), device drivers, application programs, and so forth. The processor 102 can include any type of microprocessor or central processing unit (CPU), including programmable general-purpose or special-purpose microprocessors and/or any one of a variety of proprietary or commercially-available single or multi-processor systems. The system 100 also includes a memory 106, which can provide temporary storage for code to be executed by the processor 102 or for data that is processed by the processor 102. The memory 106 can include read-only memory (ROM), flash memory, one or more varieties of random access memory (RAM), and/or a combination of memory technologies. The various elements of the system 100 can be coupled to a bus system 108. The illustrated bus system 108 is an abstraction that a person skilled in the art will appreciate represents any one or more separate physical busses, communication lines/interfaces, and/or multi-drop or point-to-point connections, connected by appropriate bridges, adapters, and/or controllers.

The system 100 can also include a network interface 109, an input/output (I/O) interface 107, a storage device 105, a display controller 103, and a driving circuit 150. The network interface 109 can enable the system 100 to communicate with remote devices, e.g., other computing devices, over a network. The I/O interface 107 can facilitate communication between one or more I/O units 101, e.g., a handheld controller. A person skilled in the art will appreciate that the system 100 can be configured to communicate with a variety of I/O units 101. Examples of input units include handheld controllers in the form of a keyboard, a touch screen, a mouse, a joystick, and a pointing device. Examples of output units includes a speaker, a printer, a scanner, a removable memory, and the various other components of the system 100. In some embodiments, a handheld controller can be an output unit. The storage device 105 can include any conventional medium for storing data in a non-volatile and/or non-transient manner. The storage device 105 can thus hold data and/or instructions in a persistent state, i.e., the value is retained despite interruption of power to the system 100. The storage device 105 can include one or more hard disk drives, flash drives, universal serial bus (USB) drives, optical drives, various media disks or cards, and/or any combination thereof, and can be directly connected to the other components of the system 100 or remotely connected thereto, such as over a network. The display controller 103 can include a video processor and a video memory, and can generate images to be displayed on a display 111 in accordance with instructions received from the processor 102. The driving circuit 150 is discussed further below.

One or more software modules can be executed by the system 100 to facilitate human interaction with the system 100. These software modules can be part of a single program or one or more separate programs, and can be implemented in a variety of contexts, e.g., as part of an operating system, a device driver, a standalone application, and/or combinations thereof. A person skilled in the art will appreciate that any software functions being performed by a particular software module can also be performed by any other module or combination of modules.

Figure 4:
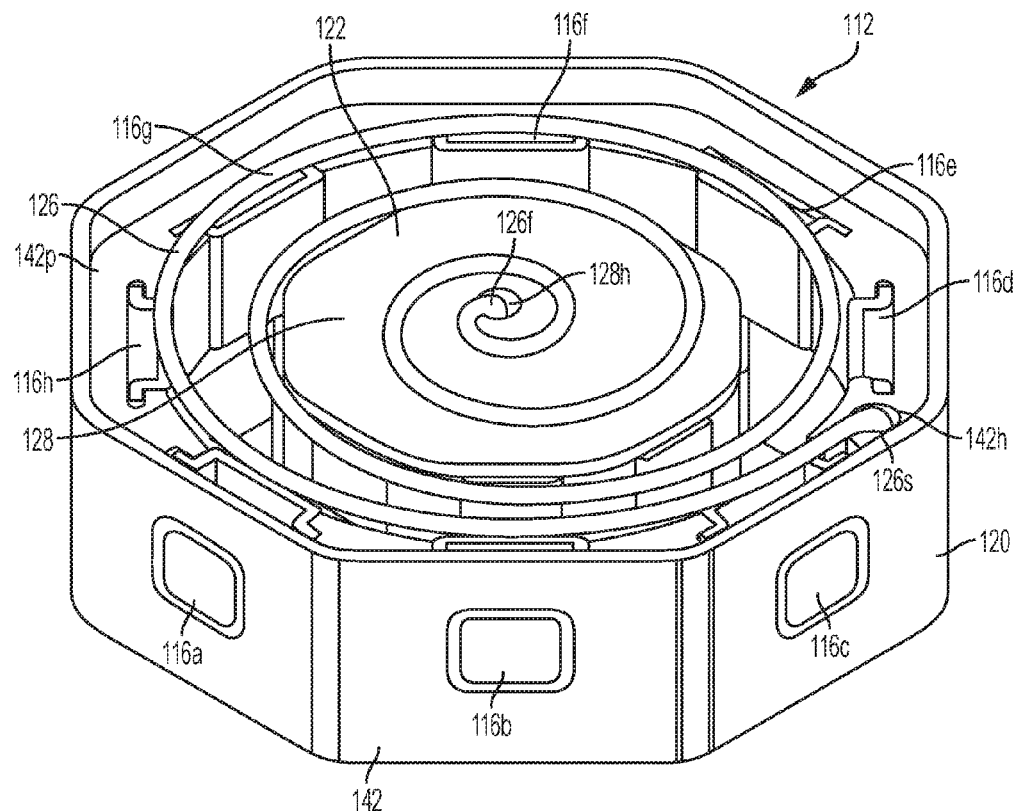
FIG. 4 is a perspective view of an impact unit included in the electronic system of FIG. 3.
Figure 5:
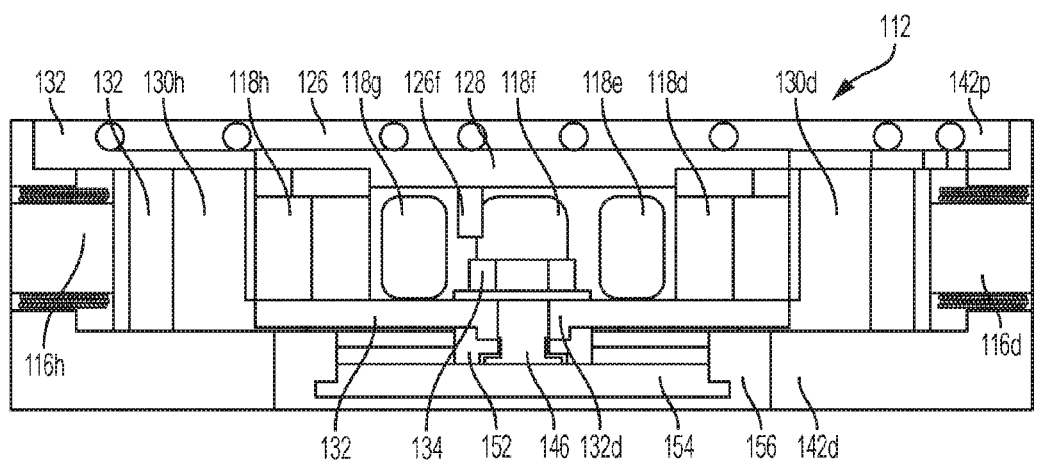
FIG. 5 is a side cross-sectional view of the impact unit of FIG. 4.

FIGS. 4 and 5 illustrate one exemplary embodiment of an impact unit 112 configured to be disposed within a body of a handheld controller (not shown), e.g., the controller 10 of FIG. 1, the controller 10' of FIG. 2, etc., and can be configured to provide a shock force or impact force to a user of the controller. In general, the impact unit 112 can include a plurality of changeable magnets 116a, 116b, 116c, 116d, 116e, 116f, 116g, 116h each configured to change between two opposite polarities. Each of the changeable magnets 116a, 116b, 116c, 116d, 116e, 116f, 116g, 116h can be configured to selectively and individually change such that polarities of any one or more of the changeable magnets 116a, 116b, 116c, 116d, 116e, 116f, 116g, 116h can be changed at any given time. Some or all of the changeable magnets 116a, 116b, 116c, 116d, 116e, 116f, 116g, 116h are also shown in FIGS. 6, 7, 11, and 12. The impact unit 112 can also include a plurality of permanent magnets 118a, 118b, 118c, 118d, 118e, 118f, 118g, 118h each having a permanent polarity. The permanent magnets 118a, 118b, 118c, 118d, 118e, 118f, 118g, 118h are obscured in FIG. 4, but some or all are shown in each of FIGS. 5 and 7-10. When the impact unit 112 is in a first configuration, each of the changeable magnets 116a, 116b, 116c, 116d, 116e, 116f, 116g, 116h can have a polarity that repels a corresponding one of the of the permanent magnets 118a, 118b, 118c, 118d, 118e, 118f, 118g, 118h. FIGS. 4 and 5 show the impact unit 112 in the first configuration. When any one or more of the changeable magnets 116a, 116b, 116c, 116d, 116e, 116f, 116g, 116h changes polarities, the one or more permanent magnets 118a, 118b, 118c, 118d, 118e, 118f, 118g, 118h corresponding to the changed one or more changeable magnets 116a, 116b, 116c, 116d, 116e, 116*f*, 116*g*, 116*h* can be attracted thereto, thereby moving the impact unit 112 from the first configuration to a second, different configuration. The movement of the impact unit 112 can cause a shock force or impact force that can be palpably detectable to a user handling the body of the controller in which the impact unit 112 is disposed. As in the illustrated embodiment, the first configuration can be a default configuration of the impact unit 112.

In the illustrated embodiment, the impact unit 112 includes eight changeable magnets 116*a*, 116*b*, 116*c*, 116*d*, 116*e*, 116*f*, 116*g*, 116*h* and eight permanent magnets 118*a*, 118*b*, 118*c*, 118*d*, 118*e*, 118*f*, 118*g*, 118*h*, with each of the changeable magnets 116*a*, 116*b*, 116*c*, 116*d*, 116*e*, 116*f*, 116*g*, 116*h* having a corresponding one of the permanent magnets 118*a*, 118*b*, 118*c*, 118*d*, 118*e*, 118*f*, 118*g*, 118*h* that faces its corresponding one of the changeable magnets 116*a*, 116*b*, 116*c*, 116*d*, 116*e*, 116*f*, 116*g*, 116*h*. As in the illustrated embodiment, a number of the impact unit's changeable magnets 116*a*, 116*b*, 116*c*, 116*d*, 116*e*, 116*f*, 116*g*, 116*h* can equal a number of the impact unit's permanent magnets 118*a*, 118*b*, 118*c*, 118*d*, 118*e*, 118*f*, 118*g*, 118*h*. In another embodiment, an impact unit can include a number of permanent magnets that is greater than a number of changeable magnets, with each of the changeable magnets having at least one corresponding permanent magnet. In this way, each of the permanent magnets can be smaller and/or have less magnetism while still being configured to be selectively repelled and attracted to a corresponding one of the changeable magnets. Similarly, in yet another embodiment, an impact unit can include a number of changeable magnets that is greater than a number of permanent magnets, with each of the permanent magnets having at least one corresponding changeable magnet. In this way, each of the changeable magnets can be smaller and/or have less magnetism while still being configured to be selectively repelled and attracted to a corresponding one of the permanent magnets.

Figure 11:
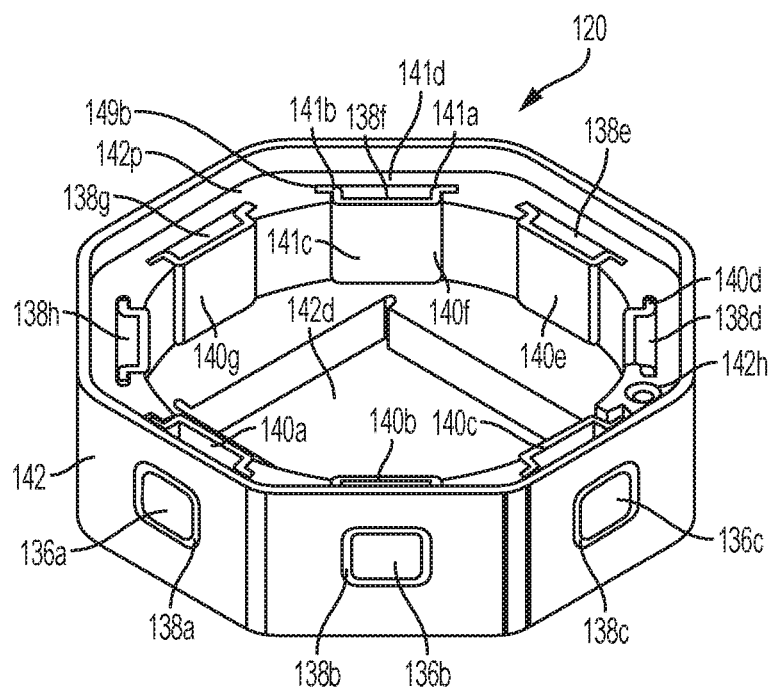
FIG. 11 is a perspective view of an outer housing of the impact unit of FIG. 4.
Figure 12:
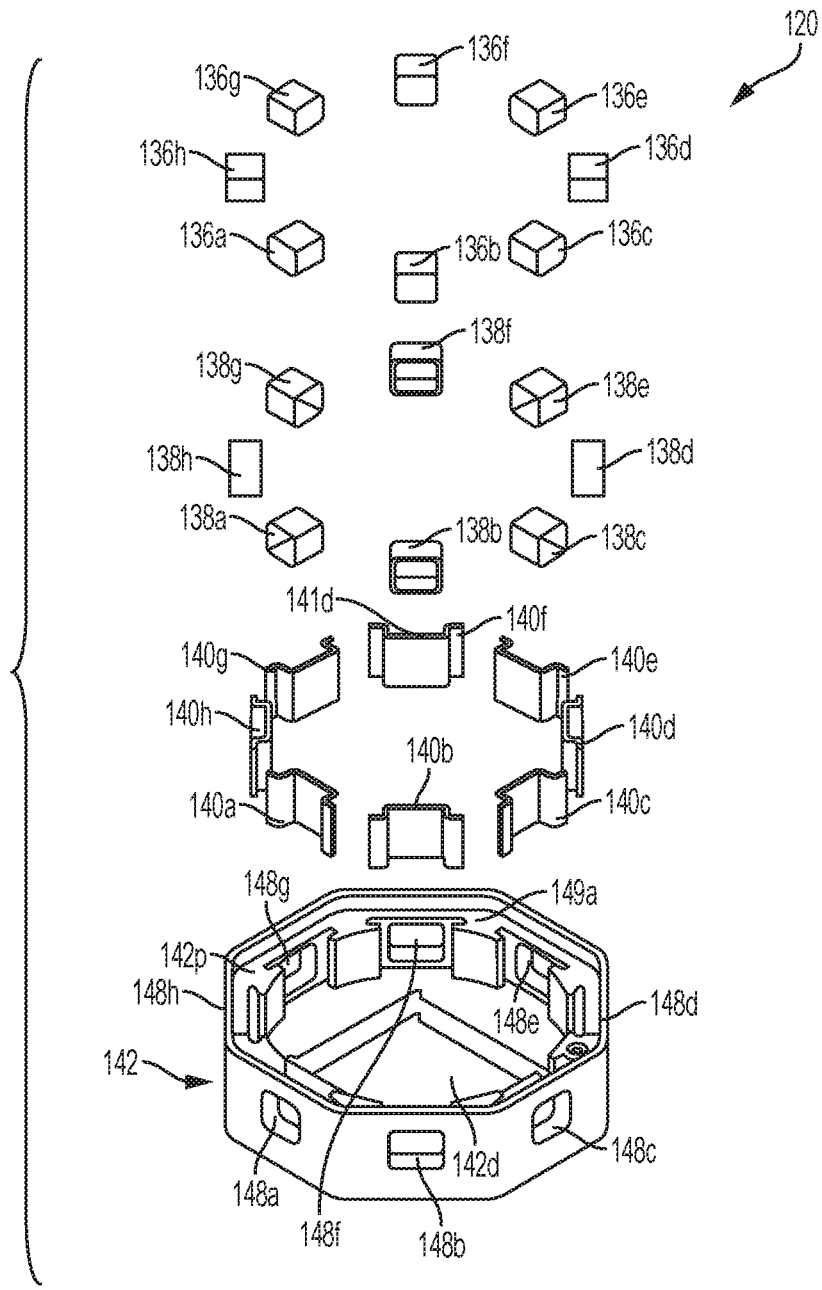
FIG. 12 is an exploded view of the outer housing of FIG. 11.
Figure 13:
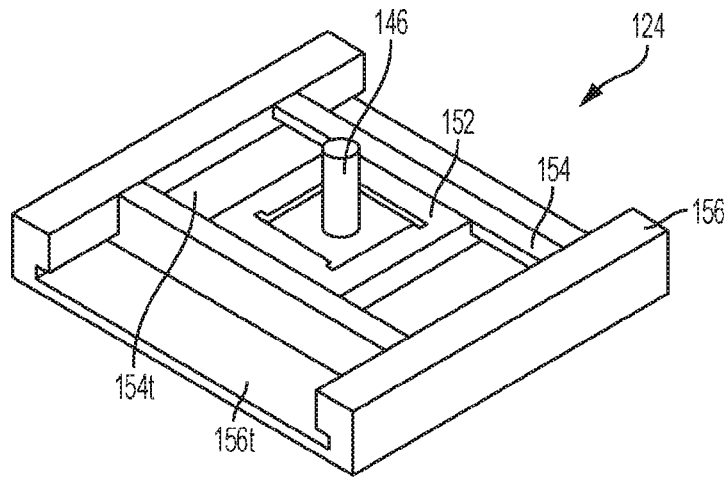
FIG. 13 is a perspective view of the movement assembly of FIG. 4.
Figure 14:
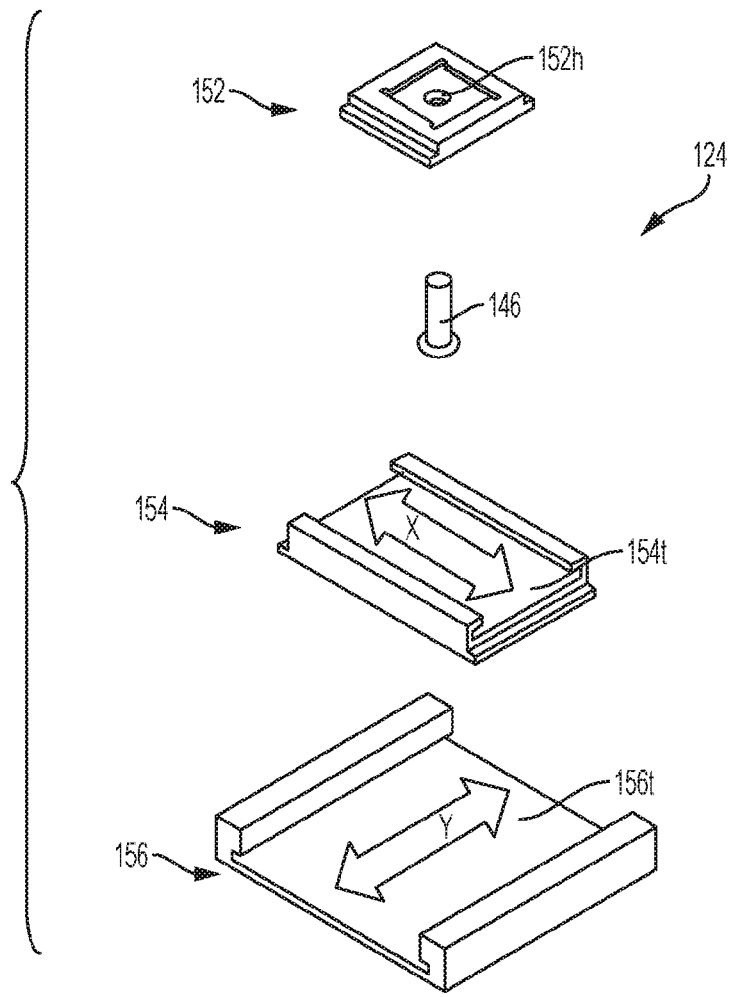
FIG. 14 is an exploded view of the movement assembly of FIG. 13.
Figure 15:
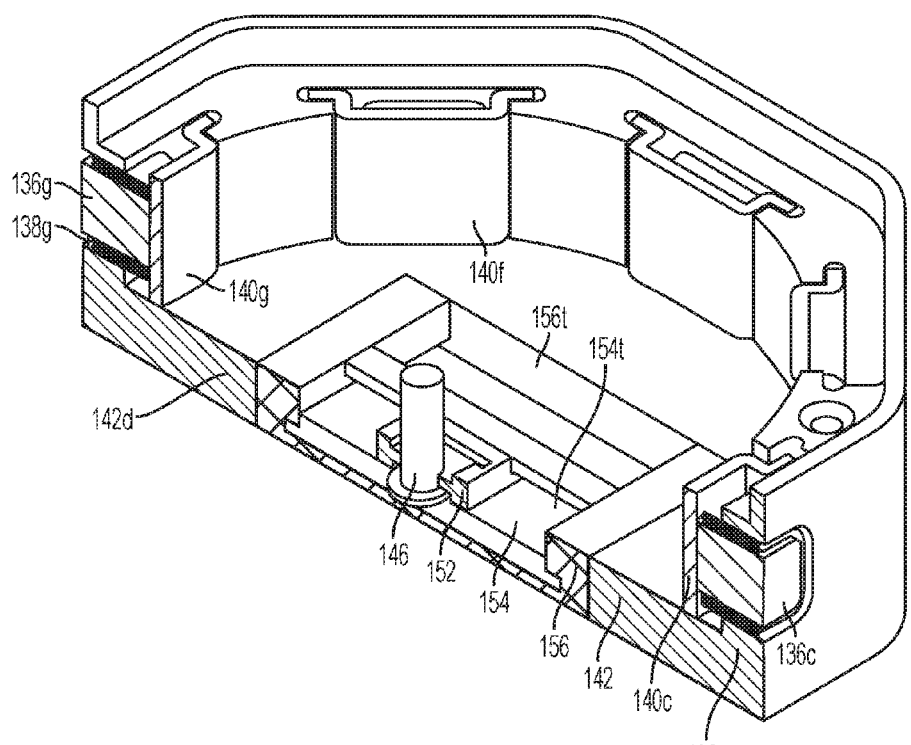
FIG. 15 is a perspective cross-sectional view of the outer housing of FIG. 11 having the movement assembly of FIG. 13 seated therein.

Referring again to FIGS. 4 and 5, the impact unit 112 can include an outer housing 120 that includes the changeable magnets 116*a*, 116*b*, 116*c*, 116*d*, 116*e*, 116*f*, 116*g*, 116*h*, an inner housing 122 that includes the permanent magnets 118*a*, 118*b*, 118*c*, 118*d*, 118*e*, 118*f*, 118*g*, 118*h*, and a movement assembly 124 configured to facilitate movement of the impact unit 112 between the first and second configurations by facilitating movement of the inner housing 122 relative to the outer housing 120. The outer housing 120 is shown in FIGS. 4-7, 11, 12, and 15, the inner housing 122 is shown in FIGS. 4, 5, and 8, and the movement assembly 124 is shown in FIGS. 13-15. Each of the outer housing 120, the inner housing 122, and the movement assembly 124 can have a variety of sizes, shapes, and configurations.

Figure 8:
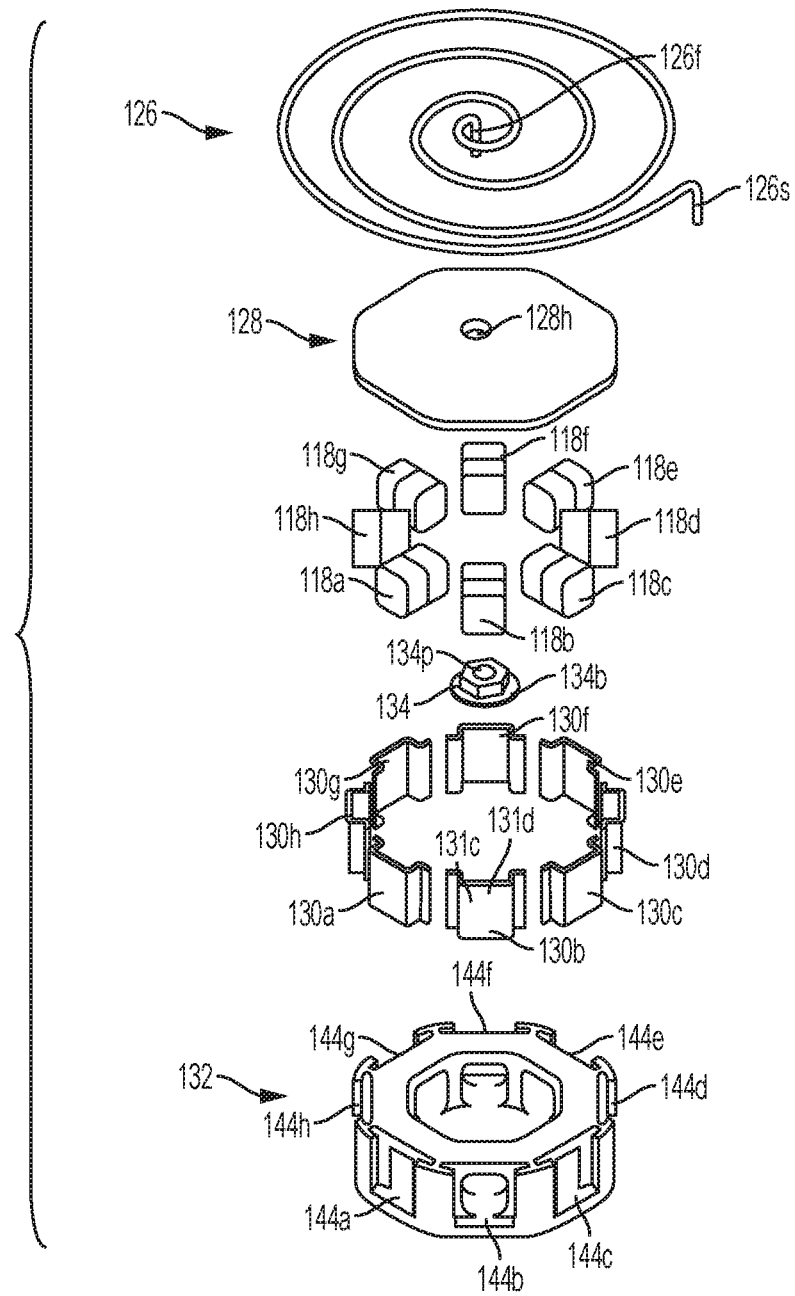
FIG. 8 is an exploded view of an inner housing and a screw of the impact unit of FIG. 4
Figure 9:
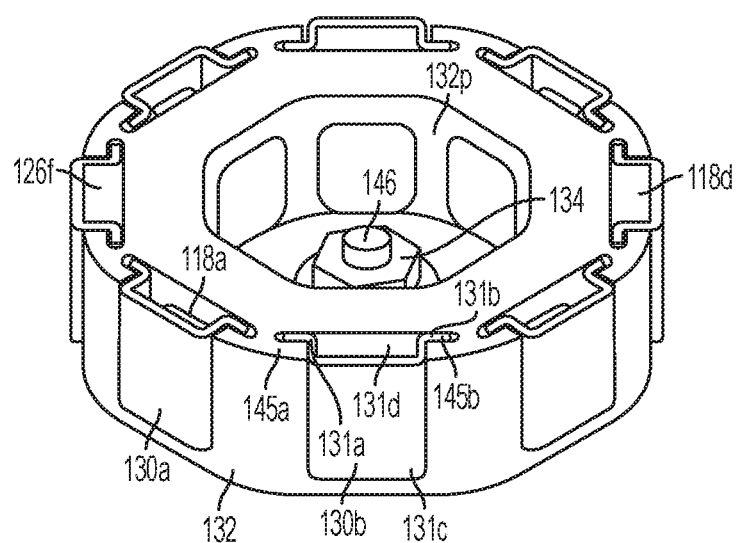
FIG. 9 is a perspective view of the inner housing and the screw of FIG. 8 attached to a movement assembly of the impact unit of FIG. 4.
Figure 10:
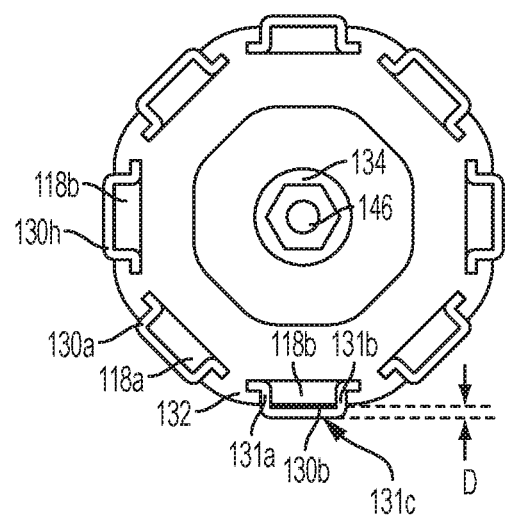
FIG. 10 is a top view of the inner housing, the screw, and the movement assembly of FIG. 9.

As shown in FIG. 8, the inner housing 122 can include a spring 126, a lid 128, the plurality of permanent magnets 118*a*, 118*b*, 118*c*, 118*d*, 118*e*, 118*f*, 118*g*, 118*h*, a plurality of inner shock protectors 130*a*, 130*b*, 130*c*, 130*d*, 130*e*, 130*f*, 130*g*, 130*h*, and an inner housing body 132. FIG. 8 also shows a screw 134 configured to facilitate attachment of the inner housing 122 to the movement assembly 124, as discussed further below. For clarity of illustration, FIGS. 9 and 10 show the inner housing 122, without the spring 126 and the lid 128, attached to the movement assembly 124 using the screw 134.

In an exemplary embodiment, the inner housing body 132 can have a number of sides equal to a number of the inner shock protectors 130*a*, 130*b*, 130*c*, 130*d*, 130*e*, 130*f*, 130*g*, 130*h*. The inner housing body 132 has an octagonal cross-sectional shape in the illustrated embodiment such that the body 132 has eight sides and eight inner shock protectors 130*a*, 130*b*, 130*c*, 130*d*, 130*e*, 130*f*, 130*g*, 130*h*, but the inner housing body can have a variety of other cross-sectional shapes, e.g., circular, hexagonal, etc. The number of the inner housing body's sides can also be equal to a number of the permanent magnets 118*a*, 118*b*, 118*c*, 118*d*, 118*e*, 118*f*, 118*g*, 118*h*, as in the illustrated embodiment.

As shown in FIGS. 5 and 8-10, the inner housing body 132 can have a proximal opening 132*p* in a proximal side thereof, and can have a distal opening 132*d* in a distal side thereof. The proximal opening 132*p* can be configured to receive a first end 126*f* of the spring 126 therethrough. The distal opening 132*d* can be configured to receive a pin 146 of the movement assembly 124, discussed further below, therethrough to facilitate coupling of the movement assembly 124 to the inner housing 122. A base 134*b* of the screw 134 can have a diameter greater than a diameter of the distal opening 132*d*, which can allows the screw's base 134*b* to be screwed against the distal side of the inner housing body 132 without passing through the distal opening 132*d*. The screw 134 can have a passageway 134*p* therethrough configured to receive the movement assembly's pin 146 therein to facilitate coupling of the movement assembly 124 to the inner housing 122.

The inner housing body 132 can be configured to seat each of the permanent magnets 118*a*, 118*b*, 118*c*, 118*d*, 118*e*, 118*f*, 118*g*, 118*h* and each of the inner shock protectors 130*a*, 130*b*, 130*c*, 130*d*, 130*e*, 130*f*, 130*g*, 130*h*. The inner housing body 132 can have a plurality of openings 144*a*, 144*b*, 144*c*, 144*d*, 144*e*, 144*f*, 144*g*, 144*h* formed therein. The openings 144*a*, 144*b*, 144*c*, 144*d*, 144*e*, 144*f*, 144*g*, 144*h* can be positioned around a perimeter of the inner housing body 132 so as to be arranged around a perimeter of the inner housing 122. In other words, the openings 144*a*, 144*b*, 144*c*, 144*d*, 144*e*, 144*f*, 144*g*, 144*h* can be radially arranged around the inner housing 122. In an exemplary embodiment, the openings 144*a*, 144*b*, 144*c*, 144*d*, 144*e*, 144*f*, 144*g*, 144*h* can be equidistantly spaced around the inner housing body's perimeter. If the inner housing body 132 has a plurality of sides, each of the sides can have one of the openings 144*a*, 144*b*, 144*c*, 144*d*, 144*e*, 144*f*, 144*g*, 144*h* formed therein, as in the illustrated embodiment. Each of the openings 144*a*, 144*b*, 144*c*, 144*d*, 144*e*, 144*f*, 144*g*, 144*h* can be configured to seat one of the permanent magnets 118*a*, 118*b*, 118*c*, 118*d*, 118*e*, 118*f*, 118*g*, 118*h* and a corresponding one of the inner shock protectors 130*a*, 130*b*, 130*c*, 130*d*, 130*e*, 130*f*, 130*g*, 130*h*. Thus, the permanent magnets 118*a*, 118*b*, 118*c*, 118*d*, 118*e*, 118*f*, 118*g*, 118*h* and the inner shock protectors 130*a*, 130*b*, 130*c*, 130*d*, 130*e*, 130*f*, 130*g*, 130*h* seated within respective ones of the openings 144*a*, 144*b*, 144*c*, 144*d*, 144*e*, 144*f*, 144*g*, 144*h* can be radially arranged around the inner housing 122 and be positioned around the perimeter of the inner housing body 132 so as to be arranged around the perimeter of the inner housing 122.

The openings 144*a*, 144*b*, 144*c*, 144*d*, 144*e*, 144*f*, 144*g*, 144*h* can each have a size and shape identical to each other, as in the illustrated embodiment. The size and shape of each of the openings 144*a*, 144*b*, 144*c*, 144*d*, 144*e*, 144*f*, 144*g*, 144*h* can correspond to a size and shape of the permanent magnets 118*a*, 118*b*, 118*c*, 118*d*, 118*e*, 118*f*, 118*g*, 118*h* and the inner shock protectors 130*a*, 130*b*, 130*c*, 130*d*, 130*e*, 130*f*, 130*g*, 130*h* seated therein. The openings 144*a*, 144*b*, 144*c*, 144*d*, 144*e*, 144*f*, 144*g*, 144*h* and the housing body 132 can cooperate in size and shape to facilitate seating of the permanent magnets 118*a*, 118*b*, 118*c*, 118*d*, 118*e*, 118*f*, 118*g*, 118*h* and the inner shock protectors 130*a*, 130*b*, 130*c*, 130*d*, 130*e*, 130*f*, 130*g*, 130*h* within their respective ones of the openings 144*a*, 144*b*, 144*c*, 144*d*, 144*e*, 144*f*, 144*g*, 144*h* without any adhesive and without any mechanical fixation element(s), e.g., a pin, a screw, etc., fixing the permanent magnets 118*a*, 118*b*, 118*c*, 118*d*, 118*e*, 118*f*, 118*g*, 118*h* and the inner shock protectors 130*a*, 130*b*, 130*c*, 130*d*, 130*e*, 130*f*, 130*g*, 130*h* to the inner housing body 132. This coupling of the permanent magnets 118*a*, 118*b*, 118*c*, 118*d*, 118*e*, 118*f*, 118*g*, 118*h*, the inner shock protectors 130*a*, 130*b*, 130*c*, 130*d*, 130*e*, 130*f*, 130*g*, 130*h*, and the inner housing body 132 can facilitate cost-effective manufacturing of the inner housing 122.

Each of the permanent magnets 118*a*, 118*b*, 118*c*, 118*d*, 118*e*, 118*f*, 118*g*, 118*h* can each have a size and shape identical to each other, as in the illustrated embodiment. Each of the inner shock protectors 130*a*, 130*b*, 130*c*, 130*d*, 130*e*, 130*f*, 130*g*, 130*h* can each have a size and shape identical to each other, as in the illustrated embodiment. The permanent magnets 118*a*, 118*b*, 118*c*, 118*d*, 118*e*, 118*f*, 118*g*, 118*h* being the same as one another and the inner shock protectors 130*a*, 130*b*, 130*c*, 130*d*, 130*e*, 130*f*, 130*g*, 130*h* being the same as one another can facilitate cost-effective manufacturing of the inner housing 122 by allowing any of the permanent magnets 118*a*, 118*b*, 118*c*, 118*d*, 118*e*, 118*f*, 118*g*, 118*h* to be seated in any of the openings 144*a*, 144*b*, 144*c*, 144*d*, 144*e*, 144*f*, 144*g*, 144*h* and by allowing any of the inner shock protectors 130*a*, 130*b*, 130*c*, 130*d*, 130*e*, 130*f*, 130*g*, 130*h* to be seated in any of the openings 144*a*, 144*b*, 144*c*, 144*d*, 144*e*, 144*f*, 144*g*, 144*h*.

The lid 128 located on a proximal side of the inner housing 122 can be configured to help contain the permanent magnets 118*a*, 118*b*, 118*c*, 118*d*, 118*e*, 118*f*, 118*g*, 118*h* and the inner shock protectors 130*a*, 130*b*, 130*c*, 130*d*, 130*e*, 130*f*, 130*g*, 130*h* within their respective ones of the openings 144*a*, 144*b*, 144*c*, 144*d*, 144*e*, 144*f*, 144*g*, 144*h*. The lid 128 can thus have a size and shape corresponding to a size and shape of the inner housing body 132 at least in a proximal portion thereof such that the lid 128 covers substantially all of the inner housing body's proximal portion so as to help securely contain the permanent magnets 118*a*, 118*b*, 118*c*, 118*d*, 118*e*, 118*f*, 118*g*, 118*h* and the inner shock protectors 130*a*, 130*b*, 130*c*, 130*d*, 130*e*, 130*f*, 130*g*, 130*h* within the inner housing body 132. When the inner housing 122 moves relative to the outer housing 122, as discussed further below, the lid 128 can be configured to help maintain the permanent magnets 118*a*, 118*b*, 118*c*, 118*d*, 118*e*, 118*f*, 118*g*, 118*h* and the inner shock protectors 130*a*, 130*b*, 130*c*, 130*d*, 130*e*, 130*f*, 130*g*, 130*h* in a fixed position relative to the inner housing body 132, as shown in FIG. 6.

Figure 6:
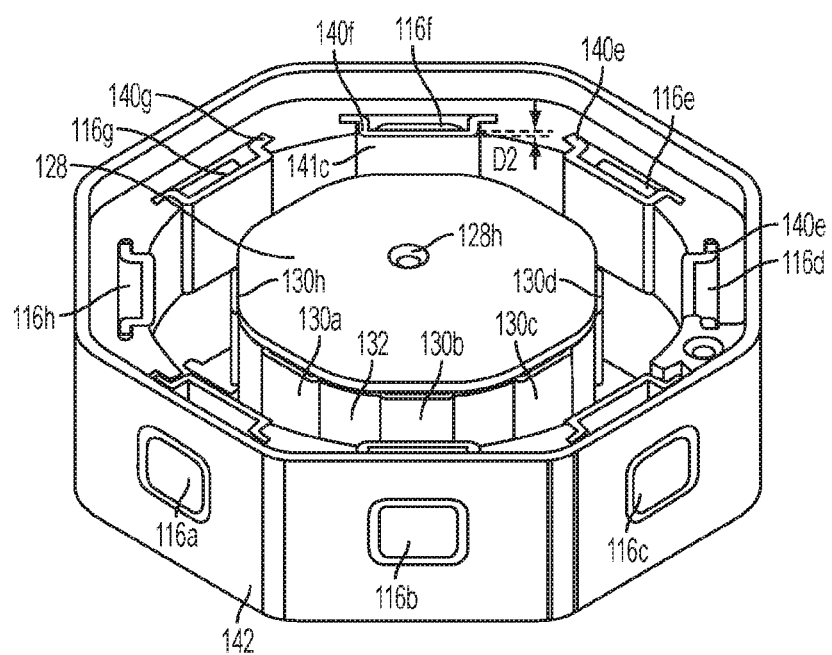
FIG. 6 is a perspective view of the impact unit of FIG. 4 with a spring of the impact unit removed.

The lid 128 can have a hole 128*h* formed therethrough, as shown in FIGS. 4, 6, and 8. The hole 128*h* can be configured to receive the first end 126*f* of the spring 126 therethrough, as shown in FIGS. 4, 5, and 8, which can facilitate coupling of the spring 126 to the impact unit 112. As in the illustrated embodiment, the hole 128*h* can be centrally located in the lid 128, which can help the spring 126 cause the inner housing 122 to be centrally positioned within the outer housing 120 when the impact unit 112 is in the default configuration. The hole 128*h* has a circular cross-sectional shape in the illustrated embodiment, but the hole 128*h* can have any shape, e.g., square, elliptical, octagonal, etc.

The inner housing 122 can be configured to be movably and floatably seated within the outer housing 120. The spring 126 can be configured to facilitate the movement of the inner housing 122 relative to the outer housing 120 and to facilitate floating of the inner housing 122 within the outer housing 120. The spring 126 can be configured to bias the inner housing 122 to a central position within the outer housing 120, as shown in FIGS. 4 and 5 in which the impact unit 112 is in the default configuration. The spring 126 can thus facilitate floating of the inner housing 122 to the central position within the outer housing 120 when the inner housing 122 moves relative to the outer housing 120, as discussed further below. A second end 126*s* of the spring 126 can be coupled to the outer housing 120, as shown in FIGS. 4 and 8 and as discussed further below. The spring 126 having one end 126*f* coupled to the inner housing 122 and another end 126*s* coupled to the outer housing 120 can also facilitate the inner housing 122 floating relative to the outer housing 120.

The spring 126 in the illustrated embodiment includes a coil spring having circular coils, but the spring 126 can have a variety of other shapes and configurations. Additionally, the spring 126 is an example of other bias elements that can be used to bias the impact unit 112 to the default configuration, such as an elastomeric disc, a rubber band, etc.

As mentioned above, in the illustrated embodiment, each of the permanent magnets 118*a*, 118*b*, 118*c*, 118*d*, 118*e*, 118*f*, 118*g*, 118*h* is identical to one another. The permanent magnets 118*a*, 118*b*, 118*c*, 118*d*, 118*e*, 118*f*, 118*g*, 118*h* in the illustrated embodiment each include a bar magnet having a south pole and a north pole. Being bar magnets can facilitate easy assembly of the inner housing 122 since the opposite poles of the bar magnet can be easily positioned on opposite sides of the openings 144*a*, 144*b*, 144*c*, 144*d*, 144*e*, 144*f*, 144*g*, 144*h*, e.g., with one pole facing radially inward and the other pole facing radially outward, with minimal chances of the bar magnets rotating or otherwise shifting position within their respective openings 144*a*, 144*b*, 144*c*, 144*d*, 144*e*, 144*f*, 144*g*, 144*h*. Any one or more of the permanent magnets 118*a*, 118*b*, 118*c*, 118*d*, 118*e*, 118*f*, 118*g*, 118*h* can, however, include a different type of magnet, e.g., a ring magnet, a ball magnet, etc.

The permanent magnets 118*a*, 118*b*, 118*c*, 118*d*, 118*e*, 118*f*, 118*g*, 118*h* can be seated in different orientations with respect to one another in respective ones of the openings 144*a*, 144*b*, 144*c*, 144*d*, 144*e*, 144*f*, 144*g*, 144*h* than others of the permanent magnets 118*a*, 118*b*, 118*c*, 118*d*, 118*e*, 118*f*, 118*g*, 118*h*. More particularly, every other one of the permanent magnets 118*a*, 118*b*, 118*c*, 118*d*, 118*e*, 118*f*, 118*g*, 118*h* can have a different pole facing radially outward, e.g., facing the outer housing 120. In other words, each of the permanent magnets 118*a*, 118*b*, 118*c*, 118*d*, 118*e*, 118*f*, 118*g*, 118*h* can have an opposite radially-outward polarity than its two adjacent permanent magnets 118*a*, 118*b*, 118*c*, 118*d*, 118*e*, 118*f*, 118*g*, 118*h*. In the illustrated embodiment, the permanent magnets 118*a*, 118*c*, 118*e*, 118*g* each have their north poles facing radially outward, and consequently have their south poles facing radially inward, e.g., facing the screw 134 and the pin 146 extending therethrough, and the permanent magnets 118*b*, 118*d*, 118*f*, 118*h* each have their south poles facing radially outward, and consequently have their north poles facing radially inward. In an exemplary embodiment, in order to ensure that every other one of the permanent magnets has an opposite polarity, the inner housing 122 can include an even number of permanent magnets.

The inner shock protectors 130*a*, 130*b*, 130*c*, 130*d*, 130*e*, 130*f*, 130*g*, 130*h* can be configured to protect their respective permanent magnets 118*a*, 118*b*, 118*c*, 118*d*, 118*e*, 118*f*, 118*g*, 118*h* from damage when the impact unit 112 generates the shock force or impact force, e.g., when the inner housing 122 moves toward and hits the outer housing 120 as discussed further below. In other words, the inner shock protectors 130*a*, 130*b*, 130*c*, 130*d*, 130*e*, 130*f*, 130*g*, 130*h* can be configured to dampen and dissipate shock or impact, thereby protecting the their respective permanent magnets 118*a*, 118*b*, 118*c*, 118*d*, 118*e*, 118*f*, 118*g*, 118*h* from damage from shock or impact.

As mentioned above, in the illustrated embodiment, each of the inner shock protectors 130*a*, 130*b*, 130*c*, 130*d*, 130*e*, 130f, 130g, 130h is identical to one another. The inner shock protectors 130a, 130b, 130c, 130d, 130e, 130f, 130g, 130h in the illustrated embodiment each include a plate. The plates can be each formed from any one or more materials, e.g., a metal such as steel. In an exemplary embodiment, the inner shock protectors 130a, 130b, 130c, 130d, 130e, 130f, 130g, 130h are formed from one or more rigid materials, which can help prevent the inner shock protectors 130a, 130b, 130c, 130d, 130e, 130f, 130g, 130h from being damaged, and hence prevent their respective permanent magnets 118a, 118b, 118c, 118d, 118e, 118f, 118g, 118h from being damaged, each time the shock force or impact force is generated.

The inner shock protectors 130a, 130b, 130c, 130d, 130e, 130f, 130g, 130h can have a variety of shapes and sizes. In an exemplary embodiment, the inner shock protectors 130a, 130b, 130c, 130d, 130e, 130f, 130g, 130h can each include a plate that has a flat, planar surface. A person skilled in the art will appreciate that due to one or more factors such as machining tolerances and types of material used to form the plates, the flat, planar surfaces of the inner shock protectors 130a, 130b, 130c, 130d, 130e, 130f, 130g, 130h may not be precisely flat or planar. Since in the illustrated embodiment, each of the inner shock protectors 130a, 130b, 130c, 130d, 130e, 130f, 130g, 130h has a same shape and size, one of the inner shock protectors 130b is discussed as a representative example. In the illustrated embodiment, as shown in FIGS. 8-10, the inner shock protector 130b has a "U" cross-sectional shape with opposed bent ends 131a, 131b, each having an "L" cross-sectional shape, and with a flat or planar portion 131c extending between the opposed bent ends 131a, 131b.

The opposed bent ends 131a, 131b and the flat or planar portion 131c can define a cavity 131d configured to seat the permanent magnet 118b therein, as shown in FIG. 10. The flat or planar portion 131c of the inner shock protector 130b can be positioned radially outward of the permanent magnet 118b, which can facilitate protection of the permanent magnet 118b. The "U" cross-sectional shape of the inner shock protector 130b can be configured to protect the inner shock protector's associated permanent magnet 118b along three faces of the rectangular box-shaped permanent magnet 118b that could be exposed to a shock force or impact force when the inner housing 122 hits against the outer housing 120, as discussed further below. As shown in FIGS. 5-10, the lid 128 and the distal side of the inner housing body 132 can each be configured to protect another side of the permanent magnet 118b. In another embodiment in which the permanent magnet 118b has a different shape, the inner shock protector 130b can have a different shape to help protect the permanent magnet 118b.

The opening 144b in which the inner shock protector 130b is seated can, as mentioned above, have a shape corresponding to the shape of the inner shock protector 130b. As shown in FIGS. 8-10, the opening 144b can include opposed channels 145a, 145b each configured to seat one of the opposed bent ends 131a, 131b of the inner shock protector 130b. The opposed channels 145a, 145b can be configured to seat the opposed bent ends 131a, 131b such that the opposed bent ends 131a, 131b are prevented, and hence the inner shock protector 130b is prevented, from moving radially inward and radially outward relative to the inner housing body 132 having the opening 144b formed therein. This limited movement can help the inner shock protector 130b absorb shock or impact with substantially no displacement of the permanent magnet 118b relative to the inner housing body 132 during shock or impact, thereby helping to protect the permanent magnet 118b from damage. The flat or planar portion 131c of the inner shock protector 130b can be exposed when the inner shock protector 130b is seated in the opening 144b, as shown in FIGS. 6, 7, 9, and 10. This exposure can facilitate the inner shock protector 130b absorbing shock or impact, as discussed further below. The inner shock protector 130b can have a size that allows the flat or planar portion 131c thereof to extend a distance D radially outward beyond an outer perimeter or circumference of the inner housing body 132, as shown in FIG. 10. In this way, each of the inner shock protectors 130a, 130b, 130c, 130d, 130e, 130f, 130g, 130h can be configured to, depending on a direction of the inner housing's movement relative to the outer housing 120, lead the inner housing 122 in movement toward the outer housing 120 and to be the first, and only, part of the inner housing 122 to hit against the outer housing 120 in generation of a shock force or impact force, thereby facilitating shock protection provided by the inner shock protectors 130a, 130b, 130c, 130d, 130e, 130f, 130g, 130h. As discussed further below, in an exemplary embodiment, only one or two of the inner shock protectors 130a, 130b, 130c, 130d, 130e, 130f, 130g, 130h hit against the outer housing 120 in generation of a shock force or impact force.

The inner housing 122 can optionally include a plurality of inner shock absorbers (not shown), with one of the inner shock absorbers being positioned between each one of the inner shock protectors 130a, 130b, 130c, 130d, 130e, 130f, 130g, 130h and their respective permanent magnets 118a, 118b, 118c, 118d, 118e, 118f, 118g, 118h. The inner shock absorbers can be configured to absorb force when the impact unit 112 generates the shock force or impact force, thereby helping to protect their respective permanent magnets 118a, 118b, 118c, 118d, 118e, 118f, 118g, 118h from damage. The inner shock absorbers can have a variety of shapes, sizes, and configurations. In an exemplary embodiment, the inner shock absorbers can be softer than the inner shock protectors 130a, 130b, 130c, 130d, 130e, 130f, 130g, 130h, which as mentioned above can be rigid members, e.g., metal plates. The inner shock absorbers can be formed from one or more shock-absorbing materials, as will be appreciated by a person skilled in the art, such as rubber, foam, gel, etc. In an exemplary embodiment, the inner shock absorbers can each be identical to one another.

As mentioned above, the inner housing 122 can be seated within the outer housing 120. As shown in FIGS. 11 and 12, the outer housing 120 can include the plurality of changeable magnets 116a, 116b, 116c, 116d, 116e, 116f, 116g, 116h, a plurality of outer shock protectors 140a, 140b, 140c, 140d, 140e, 140f, 140g, 140h, and an outer housing body 142. In an exemplary embodiment, the outer housing body 142 can have a same shape as the inner housing body 132, which can facilitate seated of the inner housing body 132 therein and facilitate shock force or impact force generation. The outer housing body 142 can thus have an octagonal shape, as in the illustrated embodiment. A number of the outer housing body's sides can be equal to a number of the outer shock protectors 140a, 140b, 140c, 140d, 140e, 140f, 140g, 140h. The number of the outer housing body's sides can also be equal to a number of the permanent changeable magnets 116a, 116b, 116c, 116d, 116e, 116f, 116g, 116h, as in the illustrated embodiment.

The outer housing body 142 can have a proximal opening 142p in a proximal side thereof, and can have a distal opening 142d in a distal side thereof. The proximal opening 142p can be configured to seat the spring 126 therein, as shown in FIGS. 4 and 5. The distal opening 142d can be configured to seat the movement assembly 124 therein, as shown in FIGS. 5 and 15 and as discussed further below, which can facilitate coupling of the movement assembly 124 to the outer housing 120. As in the illustrated embodiment, the distal opening 142d can be centrally located in the distal side of the outer housing body 142, which can help the movement assembly 124 cause the inner housing 122 to be centrally positioned within the outer housing 120 when the impact unit 112 is in the default configuration. The distal opening 142d has a square shape in the illustrated embodiment, but the distal opening 142d can have any shape, e.g., circular, elliptical, octagonal, etc.

The second end 126s of the spring 126 can be coupled to the outer housing body 142, as shown in FIG. 4. The spring's second end 126s can be coupled to the outer housing body 142 in a variety of ways, such as by being crimped thereto, welded thereto, glued or otherwise adhesively attached thereto, etc. As in the illustrated embodiment, the outer housing body 142 can have a hole 142h formed therethrough, as shown in FIGS. 4 and 11. The hole 142h can be configured to receive the second end 126s of the spring 126 therethrough, which can facilitate coupling of the spring 126 to the impact unit 112. As in the illustrated embodiment, the hole 142h can be located adjacent the perimeter of the outer housing body 142, which can help the spring 126 span across substantially all of the impact unit 112, e.g., from a central location thereof at a central location of the inner housing's lid 128 to the perimeter of the outer housing body 142. The hole 142h has a circular cross-sectional shape in the illustrated embodiment, but the hole 142h can have any shape, e.g., square, elliptical, octagonal, etc.

The outer housing body 142 can be configured to seat each of the changeable magnets 116a, 116b, 116c, 116d, 116e, 116f, 116g, 116h and each of the outer shock protectors 140a, 140b, 140c, 140d, 140e, 140f, 140g, 140h. The outer housing body 142 can have a plurality of openings 148a, 148b, 148c, 148d, 148e, 148f, 148g, 148h formed therein. The openings 148a, 148b, 148c, 148d, 148e, 148f, 148g, 148h can be positioned around a perimeter of the outer housing body 142 so as to be arranged around a perimeter of the outer housing 120. In other words, the openings 148a, 148b, 148c, 148d, 148e, 148f, 148g, 148h can be radially arranged around the outer housing 120. In an exemplary embodiment, the openings 144a 148a, 148b, 148c, 148d, 148e, 148f, 148g, 148h can be equidistantly spaced around the outer housing body's perimeter. If the outer housing body 142 has a plurality of sides, each of the sides can have one of the openings 148a, 148b, 148c, 148d, 148e, 148f, 148g, 148h formed therein, as in the illustrated embodiment. Each of the openings 148a, 148b, 148c, 148d, 148e, 148f, 148g, 148h can be configured to seat one of the changeable magnets 116a, 116b, 116c, 116d, 116e, 116f, 116g, 116h and a corresponding one of the outer shock protectors 140a, 140b, 140c, 140d, 140e, 140f, 140g, 140h. Thus, the changeable magnets 116a, 116b, 116c, 116d, 116e, 116f, 116g, 116h and the outer shock protectors 140a, 140b, 140c, 140d, 140e, 140f, 140g, 140h seated within respective ones of the openings 148a, 148b, 148c, 148d, 148e, 148f, 148g, 148h can be radially arranged around the outer housing 120 and be positioned around the perimeter of the outer housing body 142 so as to be arranged around the perimeter of the outer housing 122.

The openings 148a, 148b, 148c, 148d, 148e, 148f, 148g, 148h can each have a size and shape identical to each other, as in the illustrated embodiment. The size and shape of each of the openings 148a, 148b, 148c, 148d, 148e, 148f, 148g, 148h can correspond to a size and shape of the changeable magnets 116a, 116b, 116c, 116d, 116e, 116f, 116g, 116h and the outer shock protectors 140a, 140b, 140c, 140d, 140e, 140f, 140g, 140h seated therein. The openings 148a, 148b, 148c, 148d, 148e, 148f, 148g, 148h and the outer housing body 142 can cooperate in size and shape to facilitate seating of the changeable magnets 116a, 116b, 116c, 116d, 116e, 116f, 116g, 116h and the outer shock protectors 140a, 140b, 140c, 140d, 140e, 140f, 140g, 140h within their respective ones of the openings 148a, 148b, 148c, 148d, 148e, 148f, 148g, 148h without any adhesive and without any mechanical fixation element(s), e.g., a pin, a screw, etc., fixing the changeable magnets 116a, 116b, 116c, 116d, 116e, 116f, 116g, 116h and the outer shock protectors 140a, 140b, 140c, 140d, 140e, 140f, 140g, 140h to the outer housing body 142. This coupling of the changeable magnets 116a, 116b, 116c, 116d, 116e, 116f, 116g, 116h, the outer shock protectors 140a, 140b, 140c, 140d, 140e, 140f, 140g, 140h, and the outer housing body 142 can facilitate cost-effective manufacturing of the outer housing 120.

Figure 7:
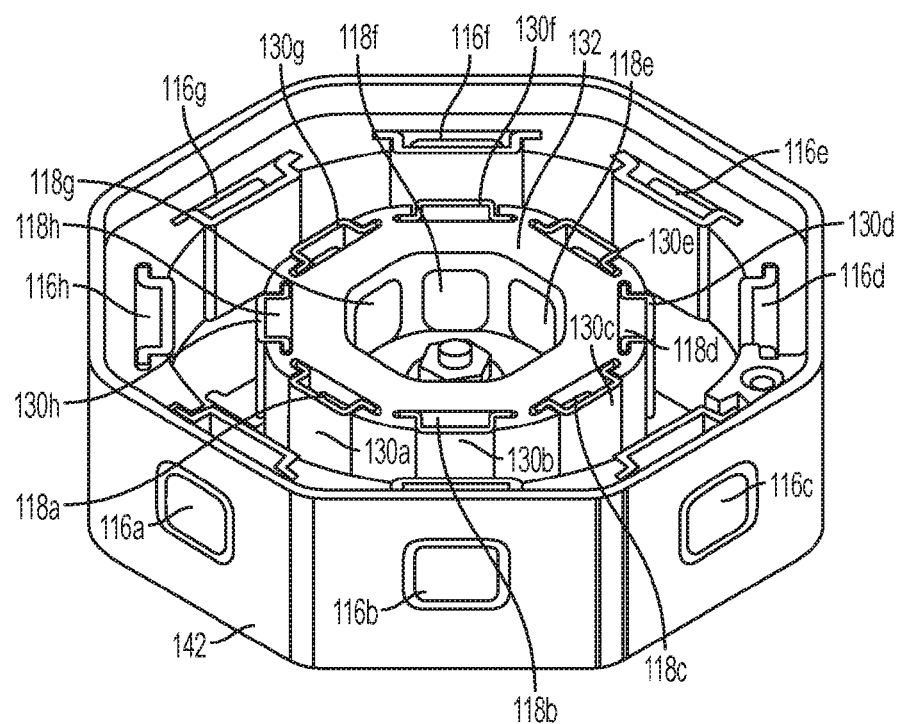
FIG. 7 is a perspective view of the impact unit of FIG. 6 with a lid of the impact unit removed.

Each of the outer housing's openings 148a, 148b, 148c, 148d, 148e, 148f, 148g, 148h can be aligned with one of the inner housing's openings 144a, 144b, 144c, 144d, 144e, 144f, 144g, 144h, such that each one of the changeable magnets 116a, 116b, 116c, 116d, 116e, 116f, 116g, 116h seated in the openings 148a, 148b, 148c, 148d, 148e, 148f, 148g, 148h can be aligned with one of the permanent magnets 118a, 118b, 118c, 118d, 118e, 118f, 118g, 118h seated in the openings 144a, 144b, 144c, 144d, 144e, 144f, 144g, 144h, as shown in FIGS. 4, 6, and 7. This alignment of the outer housing's openings 148a, 148b, 148c, 148d, 148e, 148f, 148g, 148h with the inner housing's openings 144a, 144b, 144c, 144d, 144e, 144f, 144g, 144h can facilitate direct contact between the inner shock protectors 130a, 130b, 130c, 130d, 130e, 130f, 130g, 130h and the outer shock protectors 140a, 140b, 140c, 140d, 140e, 140f, 140g, 140h in generation of the shock force or impact force, as discussed further below.

Each of the changeable magnets 116a, 116b, 116c, 116d, 116e, 116f, 116g, 116h can each have a size and shape identical to each other, as in the illustrated embodiment. Each of the outer shock protectors 140a, 140b, 140c, 140d, 140e, 140f, 140g, 140h can each have a size and shape identical to each other, as in the illustrated embodiment. The changeable magnets 116a, 116b, 116c, 116d, 116e, 116f, 116g, 116h being the same as one another and the outer shock protectors 140a, 140b, 140c, 140d, 140e, 140f, 140g, 140h being the same as one another can facilitate cost-effective manufacturing of the outer housing 120 by allowing any of the changeable magnets 116a, 116b, 116c, 116d, 116e, 116f, 116g, 116h to be seated in any of the openings 148a, 148b, 148c, 148d, 148e, 148f, 148g, 148h and by allowing any of the outer shock protectors 140a, 140b, 140c, 140d, 140e, 140f, 140g, 140h to be seated in any of the openings 148a, 148b, 148c, 148d, 148e, 148f, 148g, 148h.

A body of a handheld controller in which the impact unit 112 is disposed can be configured to help contain the changeable magnets 116a, 116b, 116c, 116d, 116e, 116f, 116g, 116h and the outer shock protectors 140a, 140b, 140c, 140d, 140e, 140f, 140g, 140h within their respective ones of the openings 148a, 148b, 148c, 148d, 148e, 148f, 148g, 148h. In this way, when the inner housing 122 moves relative to the outer housing 122, as discussed further below, the controller's body, e.g., a proximal side thereof, can be configured to help maintain the changeable magnets 116a, 116b, 116c, 116d, 116e, 116f, 116g, 116h and the outer shock protectors 140a, 140b, 140c, 140d, 140e, 140f, 140g, 140h in a fixed position relative to the outer housing body 142, as shown in FIG. 6. The outer housing body 142 and the controller's body can thus each have a size and shape that cooperate with one another to help contain the changeable magnets 116a, 116b, 116c, 116d, 116e, 116f, 116g, 116h and the outer shock protectors 140a, 140b, 140c, 140d, 140e, 140f, 140g, 140h within their respective ones of the openings 148a, 148b, 148c, 148d, 148e, 148f, 148g, 148h, such as by the proximal side of the controller's body covering the proximal opening 142p of the outer body 120, similar to the lid 128 covering substantially all of the inner housing body's proximal portion.

As mentioned above, in the illustrated embodiment, each of the changeable magnets 116a, 116b, 116c, 116d, 116e, 116f, 116g, 116h is identical to one another. Each of the changeable magnets 116a, 116b, 116c, 116d, 116e, 116f, 116g, 116h can include an electromagnet configured to change between opposite polarities, e.g., north and south. In the illustrated embodiment, each of the electromagnets 116a, 116b, 116c, 116d, 116e, 116f, 116g, 116h includes one of a plurality of cores 136a, 136b, 136c, 136d, 136e, 136f, 136g, 136h and one of a plurality of coils 138a, 138b, 138c, 138d, 138e, 138f, 138g, 138h wrapped around respective one of the cores 136a, 136b, 136c, 136d, 136e, 136f, 136g, 136h.

The cores 136a, 136b, 136c, 136d, 136e, 136f, 136g, 136h in the illustrated embodiment each include a bar having a rectangular cross-sectional shape. Being bars can facilitate easy assembly of the outer housing 120 since opposite ends of the bar can be easily positioned on opposite sides of the openings 148a, 148b, 148c, 148d, 148e, 148f, 148g, 148h, e.g., with one pole facing radially inward and the other pole facing radially outward, with minimal chances of the bars rotating or otherwise shifting position within their respective openings 148a, 148b, 148c, 148d, 148e, 148f, 148g, 148h. Any one or more of the cores 136a, 136b, 136c, 136d, 136e, 136f, 136g, 136h can, however, include a different configuration, e.g., a ring, a ball, a cylinder, etc. The cores 136a, 136b, 136c, 136d, 136e, 136f, 136g, 136h can be each formed from any one or more ferromagnetic materials, e.g., a metal such as stainless steel, iron, etc.

The coils 138a, 138b, 138c, 138d, 138e, 138f, 138g, 138h can, as will be appreciated by a person skilled in the art, include any coil configured to create a magnetic field when an electric current is applied thereto so as to flow in the coil. The coils 138a, 138b, 138c, 138d, 138e, 138f, 138g, 138h in the illustrated embodiment each include a coil of wire having a rectangular cross-sectional shape. Any one or more of the coils 138a, 138b, 138c, 138d, 138e, 138f, 138g, 138h can, however, have a different cross-sectional shape, e.g., circle, triangle, octagon, etc. The coils 138a, 138b, 138c, 138d, 138e, 138f, 138g, 138h can be each formed from any one or more materials, e.g., a metal, and can include an insulator (not shown) wrapped therearound.

Figure 16:
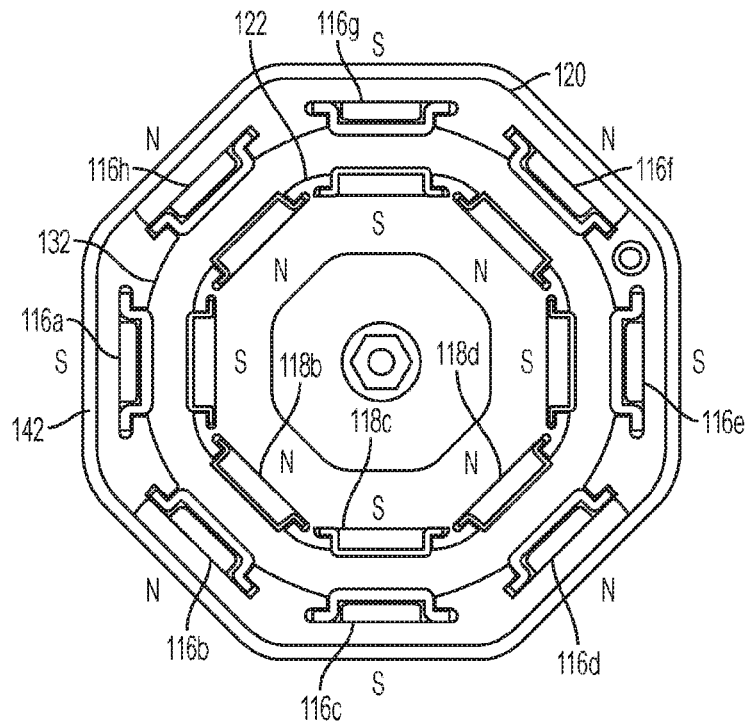
FIG. 16 is a top view of the impact unit of FIG. 7.

Each of the changeable magnets 116a, 116b, 116c, 116d, 116e, 116f, 116g, 116h can be seated in a same orientation with respect to one another in respective ones of the openings 144a148a, 148b, 148c, 148d, 148e, 148f, 148g, 148h. Depending on the electric current applied to the coils 138a, 138b, 138c, 138d, 138e, 138f, 138g, 138h, the changeable magnets 116a, 116b, 116c, 116d, 116e, 116f, 116g, 116h can have different poles facing radially inward, e.g., facing the inner housing 122. In a default configuration, e.g., when the impact unit 112 is in the default configuration, every other one of the changeable magnets 116a, 116b, 116c, 116d, 116e, 116f, 116g, 116h can have a different pole facing radially inward. In other words, in the default configuration, each of the changeable magnets 116a, 116b, 116c, 116d, 116e, 116f, 116g, 116h can have an opposite radially-inward polarity than its two adjacent changeable magnets 116a, 116b, 116c, 116d, 116e, 116f, 116g, 116h. In an exemplary embodiment, in order to ensure that every other one of the changeable magnets has an opposite polarity, the outer housing 120 can include an even number of changeable magnets. In the illustrated embodiment, the changeable magnets 116a, 116c, 116e, 116g each have their north poles facing radially inward, e.g., facing the inner housing 122, and consequently have their south poles facing radially outward, and the changeable magnets 116b, 116d, 116f, 116h each have their south poles facing radially inward, and consequently have their north poles facing radially outward. Thus, as shown in FIGS. 4, 5, and 16, when the impact unit 112 is in the default configuration, facing ones of the permanent magnets 118a, 118b, 118c, 118d, 118e, 118f, 118g, 118h and changeable magnets 116a, 116b, 116c, 116d, 116e, 116f, 116g, 116h can having the same polarity such that they repel one another. The inner housing 122 can thus be configured to centrally float within the outer housing 120 when the impact unit 112 is in the default configuration. One or more of the changeable magnets 116a, 116b, 116c, 116d, 116e, 116f, 116g, 116h changing polarities can cause the impact unit 112 to move from the default configuration to the second configuration, and hence cause the inner housing 122 to move relative to the outer housing 120, as discussed further below. Similarly, when the impact unit 112 is in the second configuration, the one or more of the changeable magnets 116a, 116b, 116c, 116d, 116e, 116f, 116g, 116h changing back to their default polarities can cause the impact unit 112 to move from the second configuration to the default configuration, and hence cause the inner housing 122 to move relative to the outer housing 120 and settle to a central position therein, as also discussed further below.

As will be appreciated by a person skilled in the art, the changeable magnets 116a, 116b, 116c, 116d, 116e, 116f, 116g, 116h can be configured to change between different charges, e.g., between having either the north pole or the south pole facing radially inward, in a variety of different ways. In an exemplary embodiment, power in the form of an electric current can be delivered to each of the coils 138a, 138b, 138c, 138d, 138e, 138f, 138g, 138h. Depending on the delivered electric current, e.g., a direction the electric current flows in the coil, the coil can have either the north pole or the south pole facing radially inward. The electric current can be delivered to the coils 138a, 138b, 138c, 138d, 138e, 138f, 138g, 138h in a variety of ways, as will be appreciated by a person skilled in the art. In an exemplary embodiment, the driving circuit 150, shown in FIG. 3, can be configured to provide the electric current to the coils 138a, 138b, 138c, 138d, 138e, 138f, 138g, 138h.

The driving circuit 150 can be coupled to each of the coils 138a, 138b, 138c, 138d, 138e, 138f, 138g, 138h via a wired connection using one or more wires (not shown). In an exemplary embodiment, the driving circuit 150 can be disposed in the controller along with but external to the impact unit 112, but in some embodiments, the driving circuit 150 can be contained within the impact unit 112 or can be external to the controller. Providing the driving circuit 150 external to the controller can reduce a cost of the controller. Providing the driving circuit 150 external to the impact unit 112 can ease manufacturing of the impact unit 112 and/or can facilitate repair and/or replacement of the driving circuit 150 and/or the impact unit 112 without requiring replacement and/or risking potential damage of the other of the driving circuit 150 and the impact unit 112.

The driving circuit 150 can have any configuration configured to provide electricity to the coils 138a, 138b, 138c, 138d, 138e, 138f, 138g, 138h, as will be appreciated by a person skilled in the art. The processor 102 can be configured to communicate with the driving circuit 150, e.g., via the bus system 108, and provide a control signal thereto. As will be appreciated by a person skilled in the art, the control signal can include one or more individual signals. The processor 102 can therefore be configured to control the driving circuit 150 and cause, e.g., via transmitted control signal, the driving circuit 150 to provide electric current to selected one(s) of the coils 138*a*, 138*b*, 138*c*, 138*d*, 138*e*, 138*f*, 138*g*, 138*h* so as to selectively and individually control polarity of the changeable magnets 116*a*, 116*b*, 116*c*, 116*d*, 116*e*, 116*f*, 116*g*, 116*h* and change the impact unit from the default position to the second, different position. When the impact unit 112 is in the default position, the driving circuit 150 need not provide any electric current to any of the changeable magnets 116*a*, 116*b*, 116*c*, 116*d*, 116*e*, 116*f*, 116*g*, 116*h*. the spring 126 can provide a biasing force to maintain the impact unit 112 in the default position with the inner housing 122 centrally floating within the outer housing 120. The biasing force provided by the spring 126 can be strong enough to counteract typical controller use movement, e.g., a user toggling a joystick, rolling a mouse, etc., and thereby prevent the inner housing 122 from colliding with the outer housing 120 so as to generate a shock force or impact force.

The outer shock protectors 140*a*, 140*b*, 140*c*, 140*d*, 140*e*, 140*f*, 140*g*, 140*h* can be configured to protect their respective changeable magnets 116*a*, 116*b*, 116*c*, 116*d*, 116*e*, 116*f*, 116*g*, 116*h* from damage when the impact unit 112 generates the shock force or impact force, e.g., when the inner housing 122 moves toward and hits the outer housing 120 as discussed further below. In other words, the outer shock protectors 140*a*, 140*b*, 140*c*, 140*d*, 140*e*, 140*f*, 140*g*, 140*h* can be configured to dampen and dissipate shock or impact, thereby protecting the their respective changeable magnets 116*a*, 116*b*, 116*c*, 116*d*, 116*e*, 116*f*, 116*g*, 116*h* from damage from shock or impact.

As mentioned above, in the illustrated embodiment, each of the outer shock protectors 140*a*, 140*b*, 140*c*, 140*d*, 140*e*, 140*f*, 140*g*, 140*h* is identical to one another. The outer shock protectors 140*a*, 140*b*, 140*c*, 140*d*, 140*e*, 140*f*, 140*g*, 140*h* in the illustrated embodiment each include a plate. The plates can be each formed from any one or more materials, e.g., a metal such as steel. In an exemplary embodiment, the outer shock protectors 140*a*, 140*b*, 140*c*, 140*d*, 140*e*, 140*f*, 140*g*, 140*h* are formed from one or more rigid materials, which can help prevent the outer shock protectors 140*a*, 140*b*, 140*c*, 140*d*, 140*e*, 140*f*, 140*g*, 140*h* from being damaged, and hence prevent their respective changeable magnets 116*a*, 116*b*, 116*c*, 116*d*, 116*e*, 116*f*, 116*g*, 116*h* from being damaged, each time the shock force or impact force is generated.

The outer shock protectors 140*a*, 140*b*, 140*c*, 140*d*, 140*e*, 140*f*, 140*g*, 140*h* can have a variety of shapes and sizes. In an exemplary embodiment, the outer shock protectors 140*a*, 140*b*, 140*c*, 140*d*, 140*e*, 140*f*, 140*g*, 140*h* can, similar to the inner shock protectors 130*a*, 130*b*, 130*c*, 130*d*, 130*e*, 130*f*, 130*g*, 130*h* discussed above, each include a plate that has a flat, planar surface. A person skilled in the art will appreciate that due to one or more factors such as machining tolerances and types of material used to form the plates, the flat, planar surfaces of the outer shock protectors 140*a*, 140*b*, 140*c*, 140*d*, 140*e*, 140*f*, 140*g*, 140*h* may not be precisely flat or planar. Since in the illustrated embodiment, each of the outer shock protectors 140*a*, 140*b*, 140*c*, 140*d*, 140*e*, 140*f*, 140*g*, 140*h* has a same shape and size, one of the outer shock protectors 140*f* is discussed as a representative example. In the illustrated embodiment, as shown in FIG. 11, the outer shock protector 140*b* has a "U" cross-sectional shape with opposed bent ends 141*a*, 141*b*, each having an "L" cross-sectional shape, and with a flat or planar portion 141*c* extending between the opposed bent ends 141*a*, 141*b*.

The opposed bent ends 141*a*, 141*b* and the flat or planar portion 141*c* can define a cavity 141*d* configured to seat the changeable magnet 116*f* therein. The flat or planar portion 141*c* of the outer shock protector 140*f* can be positioned radially inward of the changeable magnet 116*f*, which can facilitate protection of the changeable magnet 116*f*. The "U" cross-sectional shape of the outer shock protector 140*f* can be configured to protect the inner shock protector's associated changeable magnet 116*f* along three faces of the rectangular box-shaped changeable magnet 116*f* that could be exposed to a shock force or impact force when the inner housing 122 hits against the outer housing 120, as discussed further below. In another embodiment in which the changeable magnet 116*f* has a different shape, the outer shock protector 140*f* can have a different shape to help protect the changeable magnet 116*f*.

The opening 148*f* in which the outer shock protector 140*f* is seated can, as mentioned above, have a shape corresponding to the shape of the outer shock protector 140*f*. As shown in FIGS. 8-10, the opening 148*f* can include opposed channels 149*a*, 149*b* each configured to seat one of the opposed bent ends 141*a*, 141*b* of the outer shock protector 140*f*. The opposed channels 149*a*, 149*b* can be configured to seat the opposed bent ends 141*a*, 141*b* such that the opposed bent ends 141*a*, 141*b* are prevented, and hence the outer shock protector 140*f* is prevented, from moving radially inward and radially outward relative to the outer housing body 142 having the opening 148*f* formed therein. This limited movement can help the outer shock protector 140*f* absorb shock or impact with substantially no displacement of the changeable magnet 116*f* relative to the outer housing body 142 during shock or impact, thereby helping to protect the changeable magnet 116*f* from damage. The flat or planar portion 141*c* of the outer shock protector 140*f* can be exposed when the outer shock protector 140*f* is seated in the opening 148*f*, as shown in FIGS. 6, 7, and 11. This exposure can facilitate the outer shock protector 140*f* absorbing shock or impact, as discussed further below. The outer shock protector 140*f* can have a size that allows the flat or planar portion 141*c* thereof to extend a distance D2 radially inward beyond an inner perimeter or circumference of the outer housing body 142, as shown in FIG. 6. In this way, each of the outer shock protectors 140*a*, 140*b*, 140*c*, 140*d*, 140*e*, 140*f*, 140*g*, 140*h* can be configured to, depending on a direction of the inner housing's movement relative to the outer housing 120, be the first, and only, part of the outer housing 120 to hit against the inner housing 122, e.g., against corresponding ones of the inner shock protectors 130*a*, 130*b*, 130*c*, 130*d*, 130*e*, 130*f*, 130*g*, 130*h*, in generation of a shock force or impact force, thereby facilitating shock protection provided by the outer shock protectors 140*a*, 140*b*, 140*c*, 140*d*, 140*e*, 140*f*, 140*g*, 140*h*. As discussed further below, in an exemplary embodiment, only one or two of the outer shock protectors 140*a*, 140*b*, 140*c*, 140*d*, 140*e*, 140*f*, 140*g*, 140*h* hit against the inner housing 122, e.g., against corresponding ones of the inner shock protectors 130*a*, 130*b*, 130*c*, 130*d*, 130*e*, 130*f*, 130*g*, 130*h*, in generation of a shock force or impact force.

The outer housing 120 can optionally include a plurality of outer shock absorbers (not shown), with one of the outer shock absorbers being positioned between each one of the outer shock protectors 140*a*, 140*b*, 140*c*, 140*d*, 140*e*, 140*f*, 140*g*, 140*h* and their respective changeable magnets 116*a*, 116*b*, 116*c*, 116*d*, 116*e*, 116*f*, 116*g*, 116*h*. The outer shock absorbers can be configured to absorb force when the impact unit 112 generates the shock force or impact force, thereby helping to protect their respective changeable magnets 116*a*, 116*b*, 116*c*, 116*d*, 116*e*, 116*f*, 116*g*, 116*h* from damage. The outer shock absorbers can have a variety of shapes, sizes, and configurations. In an exemplary embodiment, the outer shock absorbers can be softer than the outer shock protectors 140*a*, 140*b*, 140*c*, 140*d*, 140*e*, 140*f*, 140*g*, 140*h*, which as mentioned above can be rigid members, e.g., metal plates. The outer shock absorbers can be formed from one or more shock-absorbing materials, as will be appreciated by a person skilled in the art, such as rubber, foam, gel, etc. In an exemplary embodiment, the outer shock absorbers can each be identical to one another.

Although the changeable magnets 116a, 116b, 116c, 116d, 116e, 116f, 116g, 116h are included in the outer housing 120 and the permanent magnets 118a, 118b, 118c, 118d, 118e, 118f, 118g, 118h are included in the inner housing 122 in the illustrated embodiment, the changeable magnets 116a, 116b, 116c, 116d, 116e, 116f, 116g, 116h can be included in the inner housing 122 and the permanent magnets 118a, 118b, 118c, 118d, 118e, 118f, 118g, 118h can be included in the outer housing 120. Providing the changeable magnets 116a, 116b, 116c, 116d, 116e, 116f, 116g, 116h in the outer housing 120 can be safer by allowing the coils 138a, 138b, 138c, 138d, 138e, 138f, 138g, 138h to be part of the housing 120 that does not move relative to the other housing 122 in providing a shock force or impact force. Additionally, providing the changeable magnets 116a, 116b, 116c, 116d, 116e, 116f, 116g, 116h in the outer housing 120 can allow the driving circuit 150 to more easily communicate with the changeable magnets 116a, 116b, 116c, 116d, 116e, 116f, 116g, 116h since wire(s) connecting the driving circuit 150 and the changeable magnets 116a, 116b, 116c, 116d, 116e, 116f, 116g, 116h can more easily reach the outer housing 120 than the inner housing 122.

As mentioned above, the movement assembly 124 can be configured to facilitate movement of the inner housing 122 relative to the outer housing 120. In general, the movement assembly 124 can be configured to allow the inner housing 122 to move laterally relative to the outer housing 120 to linear motion. The movement assembly 124 can thus allow the inner housing 122 to move in an X direction, shown by an arrow X in FIG. 14, and in a Y direction, shown by an arrow Y in FIG. 14, that is perpendicular to the X direction. The X and Y directions are arbitrarily designated in FIG. 14 and could be in other perpendicular directions depending on a vantage point of the movement assembly 124. The movement assembly 124 can be configured to limit the inner housing 122 to this lateral movement. The movement assembly 124 can thus be configured to prevent the inner housing 122 from rotating relative to the outer housing 120. The movement of the inner housing 122 relative to the outer housing 120 can thus be limited to simple linear motion, which can help prevent damaging the inner housing 122 and/or the outer housing 120 when the inner housing 122 moves relative to the outer housing 120 because the inner housing 122 does not move in a complicated, three-dimensional path of motion that can wear parts through stress.

As shown in FIGS. 13-15, the movement assembly 124 can include a first slidable member 152, a second slidable member 154, and a base 156. The base 156 can have a Y track 156t formed therein that extends in the Y direction. The second slidable member 154 can be configured to be seated in the Y track 156t, as shown in FIGS. 13 and 15. The second slidable member 154 can have an X track 154t formed therein that extends in the X direction. The first slidable member 152 can be configured to be seated in the X track 154t, as shown in FIGS. 13 and 15. The first slidable member 152 can have a hole 152h formed therethrough. The hole 152h can be configured to receive the pin 146 therethrough, as shown in FIGS. 5, 13, and 15. As mentioned above, the distal opening 132d of the inner housing body 132 can be configured to receive the pin 146 therethrough. The movement assembly 124 can thus be coupled to the inner housing 122.

The movement assembly 124 can also be coupled to the outer housing 120. The base 156 can be configured to be seated in the distal opening 142d in the distal side of the outer housing body 142 of the outer housing 120, as shown in FIGS. 5 and 15. The relative sizes and shapes of the distal opening 142d and the base 156 can be such that the base 156 can be prevented from moving relative to the outer housing 120. In other words, the base 156 can be fixedly seated within the outer housing 120, e.g., by any one or more of an interference fit, a snap fit, an adhesive, etc.

The first slidable member 152 can be configured to slide within the X track 154t relative to the second slidable member 154, the base 156, and the outer housing 120 in the X direction. Because the inner housing 122 can be coupled to the movement assembly 124 via the pin 146, movement of the first slidable member 152 in the X direction in the X track 154t can cause the inner housing 122 to move correspondingly in the X direction relative to the outer housing 120. The second slidable member 154 can be configured to slide within the Y track 156t relative to the base 156 and the outer housing 120 in the Y direction. Because the first slidable member 152 can be seated in the second slidable member 154, the first slidable member 152 can move with the second slidable member 154 relative to the base 156 and the outer housing 120 in the Y direction. Because the inner housing 122 can be coupled to the movement assembly 124 via the pin 146, movement of the second slidable member 154 in the Y direction in the Y track 156t can cause the inner housing 122 to move correspondingly in the Y direction relative to the outer housing 120. The inner housing 122 can be caused move in only one of the X and Y directions at a time, e.g., by only the first slidable member 152 sliding in the X track 154t or only the second slidable member 154 sliding in the Y track 156t, or the inner housing 122 can be caused to simultaneously move in both the X and Y directions, e.g., by the first slidable member 152 sliding in the X track 154t simultaneously with the second slidable member 154 sliding in the Y track 156t.

Movement of the movement assembly 124 in the X and Y directions can be passive movement. In other words, instead of actively causing movement in the X and Y directions, the movement assembly 124 can be configured to allow movement in the X direction and/or the Y direction in reaction to an external force. The external force can be provided by attraction of one or more of the changeable magnets 116a, 116b, 116c, 116d, 116e, 116f, 116g, 116h to corresponding one or more of the permanent magnets 118a, 118b, 118c, 118d, 118e, 118f, 118g, 118h. In other words, the external force can be provided when the polarity of one or more of the changeable magnets 116a, 116b, 116c, 116d, 116e, 116f, 116g, 116h changes from the default position, in which corresponding ones of the changeable magnets 116a, 116b, 116c, 116d, 116e, 116f, 116g, 116h and the permanent magnets 118a, 118b, 118c, 118d, 118e, 118f, 118g, 118h are repelled from one another, to the second position, in which a subset of the changeable magnets 116a, 116b, 116c, 116d, 116e, 116f, 116g, 116h are attracted to a corresponding subset of the permanent magnets 118a, 118b, 118c, 118d, 118e, 118f, 118g, 118h. As discussed above, this change can occur when the processor 102 transmits a signal to the driving circuit 150.

A plurality of the changeable magnets 116a, 116b, 116c, 116d, 116e, 116f, 116g, 116h can change polarities from the default configuration to the second position. In an exemplary embodiment, only two or three of the changeable magnets 116a, 116b, 116c, 116d, 116e, 116f, 116g, 116h change polarities from the default position to the second position. With eight changeable magnets 116a, 116b, 116c, 116d, 116e, 116f, 116g, 116h, the impact unit 112 can thus have seventeen different possible positions of the inner housing 122 relative to the outer housing 120, the default configuration and sixteen different second configurations. If an impact unit includes a number of changeable magnets other than eight, a number of possible positions of the impact unit's inner housing relative to the impact unit outer housing can be different than seventeen. A number of possible second positions can be equal to twice a number of changeable magnets, e.g., at least twelve positions for six changeable magnets, at least fourteen positions for seven changeable magnets, at least sixteen positions for eight changeable magnets, etc. A total number of possible positions can be equal to one more than the number of possible second positions, e.g., to include the default position.

Figure 17:
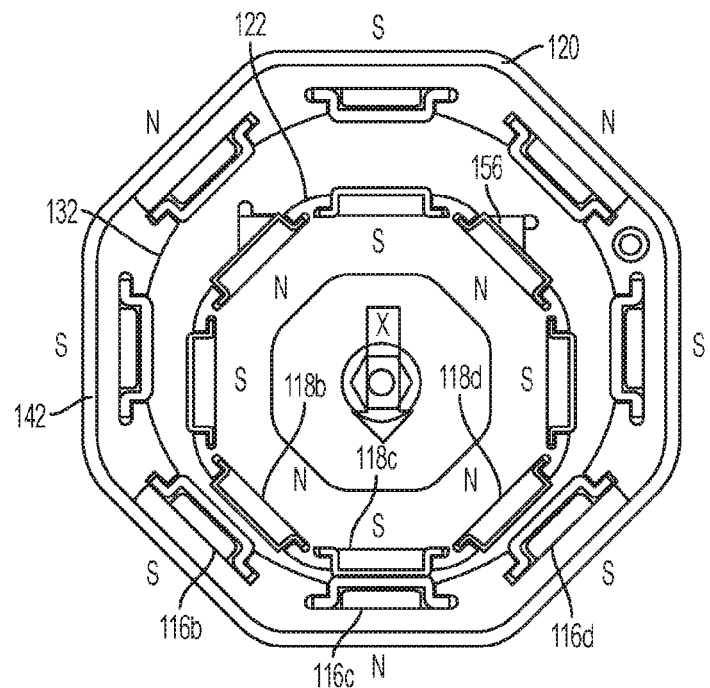
FIG. 17 is a top view of the impact unit of FIG. 16 with the inner housing of the impact unit moved to a different position relative to the outer housing of the impact unit.
Figure 18:
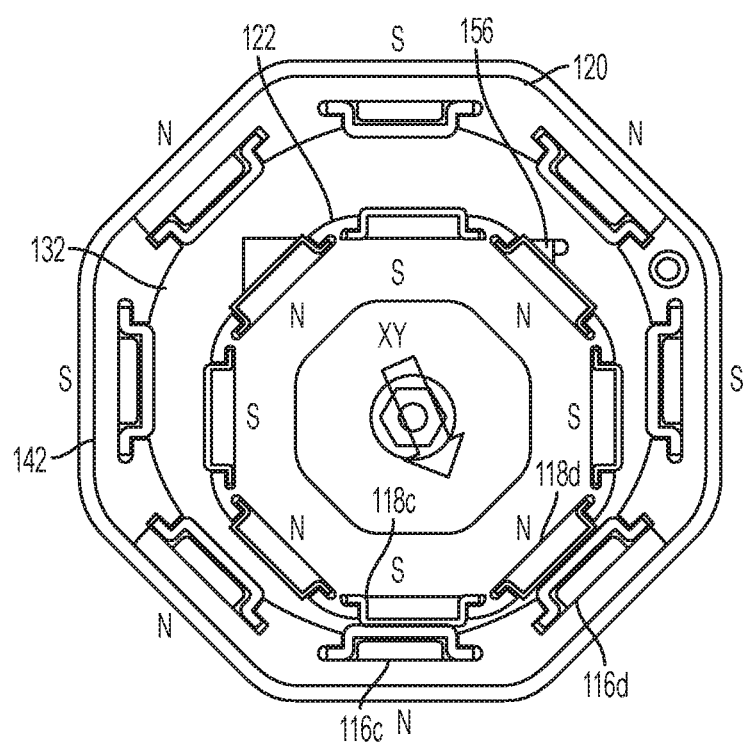
FIG. 18 is a top view of the impact unit of FIG. 16 with the inner housing of the impact unit moved to another different position relative to the outer housing of the impact unit.

FIG. 16 shows the default position, and FIGS. 17 and 18 each illustrate an example of the second position. FIG. 19 indicates the seventeen possible positions of the inner housing 122 relative to the outer housing 120, with position 0 representing the default position and positions 1-16 indicating possible second positions. The numbering of the positions 1-16 does not necessarily indicate an order in which the inner housing 122 moves relative to the outer housing 120. FIG. 19 also shows which of the changeable magnets 116a, 116b, 116c, 116d, 116e, 116f, 116g, 116h change polarities in each of the positions, as well as which Figures illustrate the various positions.

Which second position the impact unit 112 moves to from the default position can be in response to the control signal transmitted by the processor 102 to the driving circuit 150. The processor 102 can determine which direction a virtual shock force or impact force occurs in the system 100 being displayed on the display 111. The processor 102 can instruct the driving circuit 150 via the control signal which of the changeable magnets 116a, 116b, 116c, 116d, 116e, 116f, 116g, 116h to change so that the actual shock force or impact force is provided in the direction of the virtual shock force or impact force.

In FIG. 17, three of the changeable magnets 116b, 116c, 116d have changed polarities from the default configuration (the magnets 116b, 116d from north to south, and the magnet 116c from south to north), thereby causing the three of the changeable magnets 116b, 116c, 116d to be attracted to their corresponding permanent magnets 118b, 118c, 118d. This attraction causes the inner housing 122 to move relative to the outer housing 120. Whether the inner housing 122 moves in the X direction, the Y direction, or both of the X and Y directions relative to the outer housing 122 depends on which of the changeable magnets 116a, 116b, 116c, 116d, 116e, 116f, 116g, 116h change polarity. From FIG. 16 to FIG. 17, the inner housing 122 has moved relative to the outer housing 120 in the X direction, as shown by the arrow X in FIG. 17. The first slidable member 152 has thus moved in the X track 154t in the X direction from its position in FIG. 16 to its position in FIG. 17. The second slidable member 154 has not slid in the Y track 156t from its position in FIG. 16 to its position in FIG. 17. The inner housing 122 has thus not moved in the Y direction from its position in FIG. 16 to its position in FIG. 17.

The attraction between the changed changeable magnets 116b, 116c, 116d and their corresponding permanent magnets 118b, 118c, 118d can also cause a shock force or impact force by the inner housing 122 colliding with the outer housing 120. A remainder of the changeable magnets 116a, 116e, 116f, 116g, 116h and the permanent magnets 118a, 118e, 118f, 118g, 118h remain repelled, the repelling forces encouraging the attraction of the changed changeable magnets 116b, 116c, 116d and their corresponding permanent magnets 118b, 118c, 118d. As discussed above, the inner shock protectors 130a, 130b, 130c, 130d, 130e, 130f, 130g, 130h can extend radially outward from the inner housing body 132, and the outer shock protectors 140a, 140b, 140c, 140d, 140e, 140f, 140g, 140h can extend radially inward from the outer housing body 142. Thus, one or more of the inner shock protectors 130a, 130b, 130c, 130d, 130e, 130f, 130g, 130h can collide with one or more of the outer shock protectors 140a, 140b, 140c, 140d, 140e, 140f, 140g, 140h. In the position illustrated in FIG. 17, the inner shock protector 118c has collided with the outer shock protector 116c.

Because magnetic attraction can be strong and can quickly cause the permanent magnets 18a, 118b, 118c, 118d, 118e, 118f, 118g, 118h to be attracted to their corresponding changed changeable magnets 116a, 116b, 116c, 116d, 116e, 116f, 116g, 116h, the collision can be relatively strong, thereby providing a relatively strong shock force or impact force. The shock force or impact force provided by a collision between one or more of the permanent magnets and corresponding one or more of the changeable magnets can thus be greater than a vibration force, which only provides a shaking sensation to a handheld controller rather than provide a sharp collision sensation to a handheld controller as with the impact unit 112.

In FIG. 18, two of the changeable magnets 116c, 116d have changed polarities from the default configuration (the magnet 116d from north to south, and the magnet 116c from south to north), and the inner housing 122 has moved relative to the outer housing 120 in the X direction and in the Y direction, as shown by arrow XY in FIG. 18. The first slidable member 152 has thus moved in the X track 154t in the X direction from its position in FIG. 16 to its position in FIG. 18, and the second slidable member 154 has slid in the Y track 156t from its position in FIG. 16 to its position in FIG. 18. In the position illustrated in FIG. 17, the inner shock protectors 118c, 118d have collided with the outer shock protectors 116c, 116d.

Figure 20:
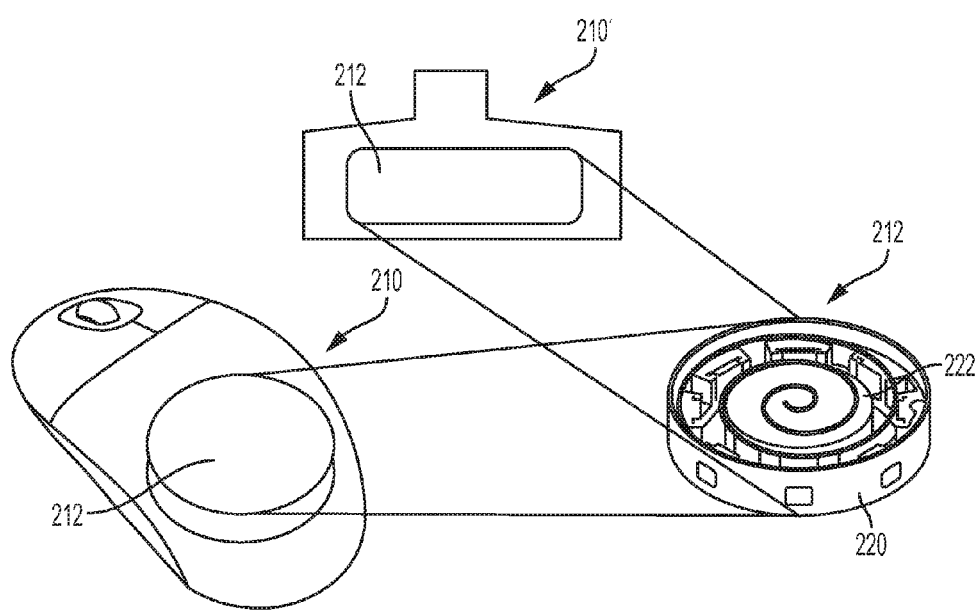
FIG. 20 is a perspective view of another embodiment of an impact unit and two embodiments of handheld controllers in which the impact unit can be disposed.

FIG. 20 illustrates another embodiment of an impact unit 212 configured to be disposed within a body of a handheld controller, e.g., a controller 210 in a form of a mouse, a controller 210' in a form of a joystick paddle, etc., and can be configured to provide a shock force or impact force to a user of the controller. The impact unit 212 in the illustrated embodiment has a circular cross-sectional shape and includes an outer housing 220 having an inner housing 222 movably disposed therein.

Although the invention has been described by reference to specific embodiments, a person skilled in the art will understand that numerous changes may be made within the spirit and scope of the inventive concepts described. A person skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A device, comprising:
   an outer housing having a plurality of changeable electromagnets disposed around a perimeter thereof, each changeable electromagnet having a polarity configured to be selectively changeable to an opposite polarity; and
   an inner housing seated within the outer housing, the inner housing being configured to move relative to the outer housing, the inner housing having a plurality of permanent magnets disposed around a perimeter thereof, each of the permanent magnets having a permanent polarity and facing one of the changeable electromagnets having a default polarity opposite to the permanent polarity of the magnet, the inner housing being configured to remain at a first position relative to the outer housing while the electromagnets are in their default polarities and the inner housing being configured to move from the first position to a second position, offset from the first position relative to the housing, when the polarity of at least one of the electromagnets changes from its default polarity to its opposite polarity.

2. The device of claim 1, wherein the inner housing in the first position is configured to be centrally positioned within the outer housing and the inner housing in the second position is configured not to be centrally positioned within the outer housing.

3. The device of claim 1, wherein the outer housing is configured to be disposed within a handheld entertainment controller.

4. The device of claim 1, wherein the second position is one of at least sixteen different possible positions of the inner member relative to the outer member.

5. The device of claim 1, further comprising a movement assembly coupled to the inner housing and configured to limit movement of the inner housing relative to the outer housing in an X direction and in a Y direction perpendicular to the X direction, and to prevent the inner housing from rotating relative to the outer housing, when the at least one of the electromagnets changes from the default polarity to the other, opposite polarity.

6. The device of claim 5, wherein the second position is one of a number of possible positions of the inner member relative to the outer member, the number being twice a number of the electromagnets.

7. The device of claim 5, wherein the movement assembly comprises:
a slidable member attached to the inner housing;
a first track in which the slidable member is configured to move in the X direction so as to move the inner housing in the X direction; and
a second track in which the slidable member is configured to move in the Y direction so as to move the inner housing in the Y direction.

8. The device of claim 1, further comprising a body having the outer housing and the inner housing disposed therein, the body being configured to move when the at least one of the electromagnets changes from the default polarity to the other, opposite polarity.

9. The device of claim 8, further comprising a processor configured to cause the at least one of the electromagnets to change from the default polarity to the other, opposite polarity in response to an impact force that occurs in action of an entertainment system displayed on a display, thereby causing the housing to move and provide physical feedback of the impact force to a user manipulating the body, the body comprising a user controller of the entertainment system.

10. A system comprising:
a housing configured to be manipulated by a hand of a user in controlling action of an entertainment system displayed on a display; and
a movement assembly disposed within the housing, the movement assembly including:
an outer member having a plurality of changeable magnets disposed around a perimeter thereof, each changeable magnet having a polarity configured to be selectively changeable to an opposite polarity;
an inner member disposed within the outer member, the inner member being configured to move relative to the outer member in an X direction and in a Y direction perpendicular to the X direction, the inner member having a plurality of permanent magnets disposed around a perimeter thereof, each of the permanent magnets having a permanent polarity and facing one of the changeable magnets having a default polarity opposite to the permanent polarity of the magnet, the inner member being configured to move in at least one of the X direction or the Y direction, when the polarity of at least one of the magnets changes from its default polarity to its opposite polarity; and
a translation member configured to limit movement of the inner member relative to the outer member to the X direction and the Y direction and configured to prevent the inner member from rotating relative to the outer member.

11. The system of claim 10, wherein the movement assembly comprises:
a slidable member attached to the inner member;
a first track in which the slidable member is configured to slide in the X direction so as to move the inner member in the X direction; and
a second track in which the slidable member is configured to slide in the Y direction so as to move the inner member in the Y direction.

12. The system of claim 10, wherein the translation member is configured to allow the inner member to move relative to the outer member in the X direction and the Y direction such that the inner member can move in at least sixteen different directions relative to the outer member.

13. The system of claim 10, wherein the plurality of the magnets of the outer housing are electromagnets.

14. The system of claim 10, further comprising a processor configured to cause the inner member to move relative to the outer member in at least one of the X direction and the Y direction in response to an impact force that occurs in the action of the entertainment system displayed on the display, thereby causing the housing to move and provide physical feedback of the impact force to the user manipulating the housing.

* * * * *